United States Patent
Derfuss et al.

(10) Patent No.: US 9,561,613 B2
(45) Date of Patent: Feb. 7, 2017

(54) APPARATUS AND PROCESS FOR PRODUCING PRODUCTS FROM PIGMENT-CONTAINING POLYMER MIXTURES

(75) Inventors: Birgit Derfuss, Muelheim an de Ruhr (DE); Michael Bierdel, Leverkusen (DE); Carsten Conzen, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 770 days.

(21) Appl. No.: 13/809,578

(22) PCT Filed: Jul. 13, 2011

(86) PCT No.: PCT/EP2011/061950
§ 371 (c)(1),
(2), (4) Date: Jan. 10, 2013

(87) PCT Pub. No.: WO2012/007501
PCT Pub. Date: Jan. 19, 2012

(65) Prior Publication Data
US 2013/0113134 A1    May 9, 2013

(30) Foreign Application Priority Data
Jul. 14, 2010  (EP) .................................. 10169542

(51) Int. Cl.
*B29C 47/38*  (2006.01)
*B29C 47/00*  (2006.01)
(Continued)

(52) U.S. Cl.
CPC ........... *B29C 47/38* (2013.01); *B29C 47/0021* (2013.01); *B29C 47/0854* (2013.01);
(Continued)

(58) Field of Classification Search
CPC ............. B29C 47/0021; B29C 47/0854; B29C 47/0861; B29C 47/1027; B29C 47/1063; B29C 47/38; B29C 47/402; B29C 47/404; B29C 47/60; B29C 47/6012; B29C 47/6056; B29C 47/625
See application file for complete search history.

(56) References Cited

U.S. PATENT DOCUMENTS 4,352,568 A   10/1982  Loehr et al.
5,487,602 A    1/1996  Valsamis et al.
(Continued)

FOREIGN PATENT DOCUMENTS

DE    102004010553 A1   9/2005
JP       2008094984 A   4/2008
(Continued)

OTHER PUBLICATIONS

Normen "Determination of the Dibutylphthalate Absorption of Carbon Blacks" (1978), DIN 53 601, pp. 1-3.
(Continued)

*Primary Examiner* — Alison L Hindenlang
*Assistant Examiner* — Joseph Leyson
(74) *Attorney, Agent, or Firm* — Drinker Biddle & Reath LLP

(57) ABSTRACT

The invention relates to an apparatus and a process for producing pigment-containing, in particular carbon-black-containing, polymer mixtures comprising polycarbonates and optionally elastomers, and/or other components, where the mouldings produced therefrom have, after the shaping process via injection moulding or via extrusion, improved surface properties and improved mechanical properties.

16 Claims, 7 Drawing Sheets

(51) Int. Cl.
| | |
|---|---|
| B29C 47/08 | (2006.01) |
| B29C 47/10 | (2006.01) |
| B29C 47/40 | (2006.01) |
| C08L 51/04 | (2006.01) |
| C08L 69/00 | (2006.01) |
| B29C 47/62 | (2006.01) |
| B29C 47/60 | (2006.01) |
| B29K 9/00 | (2006.01) |
| B29K 19/00 | (2006.01) |
| B29K 55/02 | (2006.01) |
| B29K 69/00 | (2006.01) |
| B29K 105/00 | (2006.01) |
| C08L 25/12 | (2006.01) |
| B82Y 30/00 | (2011.01) |

(52) U.S. Cl.
CPC ...... *B29C 47/0861* (2013.01); *B29C 47/1063* (2013.01); *B29C 47/402* (2013.01); *B29C 47/6012* (2013.01); *B29C 47/6056* (2013.01); *B29C 47/625* (2013.01); *C08L 51/04* (2013.01); *C08L 69/00* (2013.01); *B29C 47/404* (2013.01); *B29C 47/60* (2013.01); *B29K 2009/00* (2013.01); *B29K 2019/00* (2013.01); *B29K 2055/02* (2013.01); *B29K 2069/00* (2013.01); *B29K 2105/0005* (2013.01); *B29K 2105/0032* (2013.01); *B82Y 30/00* (2013.01); *C08L 25/12* (2013.01); *Y10S 977/742* (2013.01)

(56) References Cited

U.S. PATENT DOCUMENTS

| | | | |
|---|---|---|---|
| 6,165,399 A * | 12/2000 | Guntherberg | B29B 13/06 264/102 |
| 6,180,702 B1 | 1/2001 | Chung et al. | |
| 6,565,348 B1 * | 5/2003 | Snijder | B27N 3/28 366/83 |
| 2009/0088514 A1 | 4/2009 | Shiping | |
| 2011/0158039 A1 | 6/2011 | Bierdel et al. | |
| 2011/0184089 A1 | 7/2011 | Bierdel et al. | |

FOREIGN PATENT DOCUMENTS

| | | |
|---|---|---|
| WO | 2004094128 A1 | 11/2004 |
| WO | 2009153000 A1 | 12/2009 |

OTHER PUBLICATIONS

Kohlgrueber "Co-Rotating Twin-SCREQ Extruders" (2007), Hanser, pp. 218-231.
"Compounding Technology for Dilution of Carbon Black Masterbatch" (2001), JSW Plastic Process Technology News Letter, pp. 1-2.
Legrand "Handbook of Polycarbonate Science and Technology" (2011), Lieferschein, pp. 1-47.
Scholtan et al. "Bestimmung Der Teilchengroebenverteilung Von Latices Mit Der Ultrazentrifuge*" (1972), Kolloid-Z. u. Z. Polymere 250, pp. 782-796.
Donoian et al. "Effect of Kneading Block Tip Clearance on Performance of Co-Rotating Twin-Screw Extruders" (1999), ANTEC, vol. 1, pp. 220-224.
Schnell "Chemistry and Physics of Polycarbonates" (1964), Interscience Publishers, pp. 102-108.
Kohlgruber "Der Gleichlaeufige Doppelschnecken Extruder" Fundamentals, Technology, and Applications, Hanser (2007) pp. 233-244.
Ishikawa et al., "3-D Numerical Simulations of Nonisothermal Flow in Co-Rotating Twin Screw Extruders," Polymer Engineering and Science, Brookfield Center, vol. 40, No. 2, Feb. 1, 2000, pp. 357-364, XP000926883, ISSN: 0032-3888.
European Search Report and European Written Opinion (in German Language) for EP 10 16 9542, mail dated Jan. 14, 2011.
International Search Report for PCT/EP2011/061950 mailed dated Nov. 3, 2011.

* cited by examiner

APPARATUS AND PROCESS FOR PRODUCING PRODUCTS FROM PIGMENT-CONTAINING POLYMER MIXTURES

CROSS REFERENCE TO RELATED APPLICATIONS

This application is a 5371 National Stage Application of PCT/EP2011/061950, filed 13 Jul. 2011, which claims priority to German Application No. 10169542.7, filed 14 Jul. 2010.

BACKGROUND OF THE INVENTION

Field of the Invention

The invention relates to an apparatus and a process for producing pigment-containing, in particular carbon-black-containing, polymer mixtures comprising polycarbonates and optionally elastomers, and/or other components, where the mouldings produced therefrom have, after the shaping process via injection moulding or via extrusion, improved surface properties and improved mechanical properties. The pigment-containing, in particular carbon-black-containing, polymer mixtures can be produced in a single processing step via simultaneous mixing in the melt of all components, without use of pigment masterbatches premixed in the melt. The components here are mixed in the melt in a corotating twin- or multiscrew extruder under non-aggressive temperature conditions, where, in the region from the plastifying zone as far as the die plate, the ratio between external screw diameter and internal barrel diameter, and also the value of the sum of external screw diameter and screw root diameter divided by twice the axial separation are smaller for the screws of these extruders than disclosed in the prior art (e.g. in DE 10 2004 010 553 A1).

Description of Related Art

When pigment-containing, in particular carbon-black-containing, polymer mixtures comprising polycarbonate and optionally elastomers, e.g. particulate rubbers, in particular particulate graft rubbers, are produced, the mouldings produced via injection-moulding processes or extrusion processes from these polymer mixtures often exhibit surface defects attributable to insufficient dispersion of the pigment particles, to a combination of insufficiently dispersed pigment particles and elastomeric components, or to elastomers that have not been uniformly dispersed. The average diameter of surface defects of this type due to agglomerates of pigment particles and/or due to elastomers is from 10 μm to 300 μm. The size of the surface defects can be determined by way of example by means of a reflected-light microscope. By way of example here, the surface is examined through an objective with magnification of 2.5 in bright-field mode using illumination by a halogen-100 light source, and suitable measurement equipment (e.g. image-evaluation software or a scale on the objective) is used to measure surface defects detected. The average diameter is defined as the length calculated by averaging the maximum diameter longitudinally and the maximum diameter transversely. The longitudinal direction is the direction in which the length of a particle is greatest. The said surface defects produce poor appearance, which is discernible by the naked eye and is perceived as unsatisfactory in numerous applications of these coloured, in particular black-coloured, polymer mixtures. Furthermore, if the agglomerates of the pigment particle and/or of elastomers exceed a certain size, mechanical properties are impaired, for example impact resistance or tensile strain at break.

The production of carbon-black-containing polycarbonates, and the occurrence of surface defects caused by aggregates of carbon during the processing of the said polycarbonate mixtures to give foils, are known and are described in JP 2008094984. This problem with the surface is solved by selecting suitable particle sizes for the polycarbonate and suitable densities for the carbon black when producing the mixture. However, no information is given about technical measures during mixing in the melt (compounding) of the components.

U.S. Pat. No. 6,180,702, too, describes polycarbonate mixtures in which carbon black and elastomers can be present, and which are free from surface streaking. The said polymer mixtures, which are produced by conventional processes, with the aid of customary extruders, comprise specific additives aimed at avoiding the surface defects.

WO 2004/094128 describes the production of polymer mixtures made of polyarylene ethers and of polyamides with block copolymers as impact modifiers and with carbon black in customary extruders which have different length-to-diameter ratios in the two different melt-mixing zones.

The distributive dispersion of carbon black masterbatches in high-density polyethylene (HDPE) is described in the publication "Plastics Processing Technology Online-News Letter", 4 Jan. 2001, No. 0011 E, from "The Japan Steel Works, Ltd.". Better distribution and dispersion of the carbon black masterbatch in the HDPE is achieved by enlarging the gap between the flight lands of kneading elements and the wall of the barrel specifically in the mixing zone and the barrel-wall part of a twin-screw extruder. In the said publication from "The Japan Steel Works, Ltd.", the carbon black has been previously dispersed within the masterbatch, and this solution is therefore not transferrable to the use of pure, unpredispersed carbon black powder, where this is also an object of the present invention. Furthermore, the effect of additional elastomer components, and of other polymers, on the homogeneity of the mixtures remains unclear.

In the paper "Effect of kneading block tip clearance on performance of co-rotating twin-screw extruders", in "ANTEC-Conference proceedings, 1999, Vol. 1", the "Mixing" section on p. 222 states that in the case of HDPE-carbon-black-masterbatch mixtures enlarging the gap between the flight lands of kneading elements and the barrel wall of a twin-screw extruder impairs the dispersion of the carbon black masterbatch in the HDPE matrix when comparison is made with narrower gaps. In the light of the said publication, a person who is skilled in the art and who is facing the problem to be solved in the present invention would therefore have no interest in enlarging the gap.

In the prior art, for example in DE 10 2004 010 553 A1, gap widths between screw flight land (external screw diameter) and barrel wall section (internal barrel diameter) of less than 1% are stated, corresponding to an external screw diameter:internal barrel diameter ratio of more than 98.4%, and the difference between screw flight land (external screw diameter) and root (screw root diameter) of an adjacent screw element is stated to be at most 1% of the bore diameter, and the corresponding figure for the sum of external screw diameter and screw root diameter divided by twice the axial separation is 99.8%. This disclosure differs from the prior art described in that screw-based machines have screws having gap widths, between screw flight land and barrel wall section, of from 2% to 10% of the bore diameter, and a root clearance of at most 1% of the bore diameter between a screw root and a screw flight land. The said screw elements are intended to be used for shear-sensitive products, since these screw elements permit compounding at non-aggressive temperatures. However, a person skilled in the art would conclude from this information that there can be no improvement in dispersion, since less energy is introduced. Nor is anything actually said about any effects of these screw elements on the quality of dispersion and the homogeneous dispersion of infusible additives. This type of information relating to gap widths is very general in nature and not readily transferrable to filler-containing or elastomer-containing polymer mixtures.

Since no satisfactory measures for solving the present problem can be derived from the prior art, suitable measures were sought for achieving comminution, and homogeneous dispersion within the polymer matrix, of pigment particles, in particular carbon black, during mixing with compounded thermoplastic materials, preferably compounded polycarbonate materials, optionally comprising elastomers, preferably elastomer-containing compounded polycarbonate materials, under non-aggressive temperature conditions in such a way that no significant surface defects occur on the mouldings produced from these mixtures. Surface defects are unevenness phenomena directly on the surface of the moulding. The unevenness phenomena can be either depressions or elevations, where these increase the roughness of the surface. The average diameter of the depressions and, respectively, elevations is usually from 10 μm to 300 μm, where 10 μm is the lower limit of resolution of the measurement method used. This means that smaller surface defects can also occur. The depth of the depressions and, respectively, the height of the elevations is from 50 nm to 100 μm. The depth of the depressions is determined by CLSM (confocal laser scanning microscopy) topography.

A problem addressed by the invention was therefore to produce polymer mixtures comprising polycarbonate, optionally elastomers, and pigments, in particular carbon black as pigment, and also optionally further additives and thermoplastics, in which the components mentioned have excellent dispersion within the polycarbonate matrix and have such uniform distribution that mouldings obtained via injection moulding or extrusion of the said polycarbonate mixtures have a defect-free surface, and also improved mechanical properties. By virtue of the process according to the invention, and use of the apparatus according to the invention, the surface of the moulding has a smaller number of defect sites larger than 10 μm, where agglomerates of insufficiently dispersed pigment particles and/or elastomers are responsible for these defect sites. Another problem addressed by the invention was the compounding of the abovementioned components in a single melting step in tightly intermeshing, corotating twin- or multiscrew extruders with minimum energy input with avoidance of local temperature peaks and preferably without use of previously compounded pigment masterbatches, e.g. carbon-black masterbatches.

SUMMARY

Surprisingly, it has now been found that the problem addressed by the invention is solved in that the compositions of polycarbonate, of elastomer and of pigment, in particular polymer compositions comprising carbon black, are mixed in the melt in a corotating, tightly intermeshing twin-screw extruder, characterized in that, at least in the region starting from the plastifying zone and the zones subsequent thereto in the direction of conveying, as far as the polymer-melt discharge at the die plate, over at least 50%, preferably at least 75%, particularly preferably at least 90%, of the length, the ratio between external screw diameter and internal barrel diameter is smaller than 98.4%, but can vary within the said scope starting from the plastifying zone and the zones subsequent thereto in the direction of conveying, as far as the polymer-melt discharge at the die plate. It is preferable that the ratio between external screw diameter and internal barrel diameter is within the range from greater than or equal to 90.4% to smaller than 98.4%. It is particularly preferable that the ratio between external screw diameter and internal barrel diameter is in the range from greater than or equal to 92.6% to smaller than 98.4%, preferably 98.2%. It is particularly preferable that the ratio between external screw diameter and internal barrel diameter is in the range from greater than or equal to 96.4% to smaller than 98.4%, preferably 98.2%. The sum of external screw diameter and screw root diameter divided by twice the axial separation is smaller than 99.1%. It is preferable that the sum of external screw diameter and screw root diameter divided by twice the axial separation is from greater than or equal to 94.2% to smaller than 99.1%. It is particularly preferable that the sum of external screw diameter and screw root diameter divided by twice the axial separation is from greater than or equal to 95.6% to smaller than 99.1%. It is particularly preferable that the sum of external screw diameter and screw root diameter divided by twice the axial separation is from greater than or equal to 97.9% to smaller than 99.1%. In comparison with the prior art, for example that described in DE 10 2004 010 553 A1, this gives increased gaps between external screw diameter and barrel wall section, and also between screw flight land and screw root surface of the opposite screw.

DETAILED DESCRIPTION OF A PREFERRED EMBODIMENT

Figure 1:
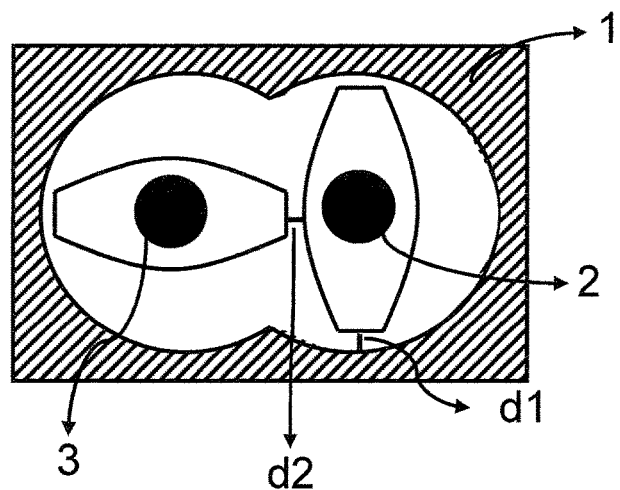
FIGS. 1-13 depict various embodiments of the present invention.

In one very preferred embodiment, there is, in the region starting from the plastifying zone and the zones subsequent thereto in the direction of conveying, as far as the polymer-melt discharge at the die plate, at least one conveying element and/or at least one kneading element which exhibits/exhibit the abovementioned ratios between external screw diameter and internal barrel diameter and sum of external screw diameter and screw root diameter divided by twice the axial separation. In this context it is possible that either at least one conveying element or at least one kneading element, or not only at least one conveying element but also at least one kneading element, exhibits/exhibit the abovementioned ratios. It is particularly preferable that either at least one conveying element or not only at least one conveying element but also at least one kneading element exhibits/exhibit the abovementioned ratios.

The extruder region termed plastifying zone is that in which solid polymer pellets are converted to the molten state. Starting from the extruder intake, a region composed entirely of conveying elements is followed by a region in which kneading elements and/or mixing elements are used. The plastifying zone as described in this patent begins at the penultimate conveying element prior to the first element which is not a conveying element. Subsequent to the plastifying zone, there can be one or more mixing and/or kneading zones, one or more conveying zones, and one discharge zone or, respectively, pressurizing zone.

From the ratio between external screw diameter and internal barrel diameter, it is possible to calculate gap widths between screw flight land and extruder barrel wall section (d1 in FIG. 1), by using relationships known to the person skilled in the art. A smaller ratio between external screw diameter and internal barrel diameter corresponds to a larger gap width in comparison with the prior art (e.g. in DE 10 2004 010 553 A1). Furthermore, the value of the sum of external screw diameter Da (FIG. 2) and screw root diameter Di (FIG. 2) divided by twice the axial separation also has a smaller value in the presence invention than that disclosed in the prior art. The person skilled in the art can determine the gap between the external diameter of one of the screws and the root diameter of the other screw (d2 in FIG. 1) from the data described, given knowledge of the axial separation of the two screws. A smaller sum of external screw diameter Da (FIG. 2) and screw root diameter Di (FIG. 2) divided by twice the axial separation corresponds to greater clearance between the flight land of one of the screws and the root surface of the other screw.

Within the system composed of external screw diameter and internal barrel diameter, the gap width is always calculated by comparing the external diameter of an element with the barrel section which surrounds the corresponding element in the installed condition. The said barrel section is hereinafter termed the barrel section associated with the screw element. If it is not possible to associate a screw element unambiguously with a barrel-section component, for example if it extends at least to some extent over two barrel sections, the corresponding element is divided, in virtual terms, into two parts for the purposes of the calculation. The respective external screw diameters are allocated as follows: the initial external diameter of the screw element (Da_initial in FIG. 2) is allocated to one part of the length of the element, and the final external diameter of the screw element (Da_final in FIG. 2) is allocated to the other part. The first part of the screw element thus produced in virtual terms is allocated to the first barrel section, and the second part of the screw element is allocated to the second barrel section. If the location of the screw element is entirely within one barrel section, the screw element is allocated, for the purposes of calculation of gap width, to the barrel section which is its location.

According to the invention, a longitudinal proportion of at least 50% of the screw in the region starting from the plastifying zone of the extruder and the zones subsequent thereto in the direction of conveying, as far as the polymer-melt discharge at the die plate, must lie within the stated range for the ratio between external screw diameter and internal barrel diameter and also within the stated range for the sum of external screw diameter and screw root diameter divided by twice the axial separation. It is preferable that a longitudinal proportion of at least 75%, and it is particularly preferable that a longitudinal proportion of at least 90%, of the screw, based on the barrel section associated with the respective screw element, is within the said ranges.

From the ratio between external screw diameter and internal barrel diameter, it is possible to calculate gap widths between screw flight land and extruder barrel wall section (d1 in FIG. 1), by using relationships known to the person skilled in the art.

The person skilled in the art can determine the gap between the external diameter of one of the screws and the root diameter of the other screw (d2 in FIG. 1) from the data described, given knowledge of the axial separation of the two screws.

The solution provided according to the invention for the problem is surprising insofar as the enlargement of the gap does not necessarily, according to the cited prior art, solve the problem addressed by the invention. On the contrary, the teaching of the prior art in this respect is that enlargement of the gap would not be advisable. Another equally surprising result is that enlargement of the gap in the plastifying zone of the extruder does not, alone and per se, lead to the desired result. The desired improvement in the dispersion of the pigment particles within the optionally elastomer-containing polycarbonate mixture is obtained only when the gap width is also enlarged in the following extruder zones in the direction of flow behind the plastifying zone. When the surfaces of the mouldings obtained by injection moulding from the resultant polycarbonate mixtures are compared with the corresponding polycarbonate mixtures produced on twin-screw extruders in a conventional manner with a ratio between external screw diameter and the associated internal barrel-section diameter that is greater than or equal to 98.4%, and with a sum of external screw diameter and screw root diameter divided by twice the axial separation that is greater than or equal to 99.1%, they have less than half of the number of defect sites. Defect sites are alterations on the surface of the mouldings which, when the surface is examined using a reflected-light microscope at magnification 2.5 in bright-field mode, are discernible and larger than 10 µm.

The invention therefore provides an apparatus for compounding polymer compositions made of polycarbonates, of pigments, in particular carbon black, and optionally of elastomers, and also a process for compounding the said polycarbonate compositions with the aid of the apparatus according to the invention, and polymer compositions produced by the process according to the invention, and injection-moulded articles and extrudates made of the said compositions.

The invention further provides polymer compositions made of polycarbonates, of pigments, in particular carbon black, and optionally of elastomers, where the mouldings produced therefrom have, after the shaping process via injection moulding or via extrusion, improved surface properties and improved mechanical properties, e.g. higher impact resistance.

In one preferred embodiment, compositions are produced by the production process according to the invention and comprise:

A) from 10 to 99.899 parts by weight, preferably from 20 to 98 parts by weight, particularly preferably from 30 to 95 parts by weight, of aromatic polycarbonate and/or aromatic polyester carbonate and/or other thermoplastics, B) from 0.1 to 75 parts by weight, preferably from 0.2 to 60 parts by weight, more preferably from 0.5 to 55 parts by weight, particularly preferably from 0.5 to 52 parts by weight, of elastomers, preferably rubber-modified graft polymer, C) from 0.001 to 10 parts by weight, preferably from 0.01 to 5 parts by weight, particularly preferably from 0.1 to 3 parts by weight, of organic or inorganic pigments, preferably carbon black, D) optionally from 0 to 5 parts by weight, preferably from 0.05 to 3 parts by weight, particularly preferably from 0.1 to 1.5 parts by weight, of additives, where all of the parts by weight data in the present application have been standardized in such a way that the sum of the parts by weight of all of components A+B+C+D in the composition is 100.

Component A

Suitable thermoplastics (component A) that can be used according to the invention are polycarbonate, polyamide, polyester, in particular polybutylene terephthalate and polyethylene terephthalate, polylactide, polyether, thermoplastic polyurethane, polyacetal, fluoropolymer, in particular polyvinylidene fluoride, polyether sulphones, polyolefin, in particular polyethylene and polypropylene, polyimide, polyacrylate, in particular poly(methyl)methacrylate, polyphenylene oxide, polyphenylene sulphide, polyether ketone, polyaryl ether ketone, styrene polymers, in particular polystyrene, styrene copolymers, in particular styrene-acrylonitrile copolymer, acrylonitrile-butadiene-styrene block copolymers, polyvinyl chloride or a blend of at least two of the thermoplastics mentioned.

Thermoplastics used with preference are polycarbonates.

These polycarbonates (component A) that can be used according to the invention are either homopolycarbonates or copolycarbonates; the polycarbonates can, as is known, be linear polycarbonates or branched polycarbonates.

Preferred methods of producing the polycarbonates to be used according to the invention, inclusive of the polyester carbonates, are the known interfacial process and the known melt-transesterification process.

In the first case, the carbonic derivative used preferably comprises phosgene, and in the latter case it preferably comprises diphenyl carbonate. Catalysts, solvents, work-up, reaction conditions, etc. for polycarbonate production have been adequately described and disclosed in both cases.

Some of the carbonate groups, up to 80 mol %, preferably from 20 mol % up to 50 mol %, in the polycarbonates suitable according to the invention can have been replaced by aromatic dicarboxylic ester groups. Polycarbonates of this type, comprising not only acid moieties derived from carbonic acid but also acid moieties from aromatic dicarboxylic acids, incorporated into the molecular chain, are strictly termed aromatic polyester carbonates.

When the process according to the invention is used, polycarbonates are produced in a known manner from diphenols, carbonic derivatives, optionally chain terminators and optionally branching agents, where, to produce the polyester carbonates, some of the carbonic derivatives are replaced by aromatic dicarboxylic acids or by derivatives of the dicarboxylic acids, and specifically to the extent necessary for the required replacement of carbonate structural units by aromatic dicarboxylic ester structural units within the aromatic polycarbonates.

Reference may be made here to Schnell, "Chemistry and Physics of Polycarbonates", Polymer Reviews, Volume 9, Interscience Publishers, New York, London, Sydney 1964 by way of example for the production of polycarbonates.

The average molecular weight Mw of the thermoplastic polycarbonates preferably used in the process according to the invention, inclusive of the thermoplastic, aromatic polyester carbonates, is from 12 000 to 80 000, preferably from 15 000 to 60 000 and in particular from 15 000 to 32 000 (determined via measurement of relative viscosity at 25° C. in $CH_2Cl_2$ at a concentration of 0.5 g per 100 ml of $CH_2Cl_2$).

Diphenols suitable for the process according to the invention for producing polycarbonate are widely described in the prior art.

Examples of suitable diphenols are hydroquinone, resorcinol, dihydroxybiphenyl, bis(hydroxyphenyl)alkanes, bis (hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, and also their alkylated, ring-alkylated and ring-halogenated compounds.

Preferred diphenols are 4,4'-dihydroxybiphenyl, 2,2-bis (4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxybiphenyl, 1,1-bis(4-hydroxyphenyl)phenyl-ethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and other suitable dihydroxyaryl compounds are described by way of example in DE-A 3 832 396, FR-A 1 561 518, in H. Schnell, Chemistry and Physics of Polycarbonates, Interscience Publishers, New York 1964, pp. 28 ff.; pp. 102 ff. and in D. G. Legrand, J. T. Bendler, Handbook of Polycarbonate Science and Technology, Marcel Dekker New York 2000, pp. 72 ff.

In the case of the homopolycarbonates, only one diphenol is used, but in the case of the copolycarbonates a plurality of diphenols are used, and the diphenols used can, of course, like all other auxiliaries and chemicals added to the synthesis process, have contamination by the contaminants deriving from their individual synthesis, handling and storage, but it is desirable to operate with raw materials of maximum purity.

The diaryl carbonates suitable for reaction with the dihydroxyaryl compounds in the melt-transesterification process are those of the general formula (II)

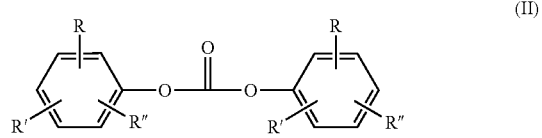

in which

R, R' and R", independently of one another, are identical or different and are hydrogen, linear or branched $C_1$-$C_{34}$-alkyl, $C_7$-$C_{34}$-alkylaryl or $C_6$-$C_{34}$-aryl, and R can moreover also be —COO—R''', where R''' is hydrogen, linear or branched $C_1$-$C_{34}$-alkyl, $C_7$-$C_{34}$-alkylaryl or $C_6$-$C_{34}$-aryl.

Examples of preferred diaryl carbonates are diphenyl carbonate, methylphenyl phenyl carbonates and di(methylphenyl)carbonates, 4-ethylphenyl phenyl carbonate, di(4-ethylphenyl)carbonate, 4-n-propylphenyl phenyl carbonate, di(4-n-propylphenyl)carbonate, 4-isopropylphenyl phenyl carbonate, di(4-isopropylphenyl)carbonate, 4-n-butylphenyl phenyl carbonate, di(4-n-butylphenyl)carbonate, 4-isobutylphenyl phenyl carbonate, di(4-isobutylphenyl)carbonate, 4-tert-butylphenyl phenyl carbonate, di(4-tert-butylphenyl) carbonate, 4-n-pentylphenyl phenyl carbonate, di(4-n-pentylphenyl)carbonate, 4-n-hexylphenyl phenyl carbonate, di(4-n-hexylphenyl)carbonate, 4-isooctylphenyl phenyl carbonate, di(4-isooctylphenyl)carbonate, 4-n-nonylphenyl phenyl carbonate, di(4-n-nonylphenyl)carbonate, 4-cyclohexylphenyl phenyl carbonate, di(4-cyclohexylphenyl)carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl)carbonate, 4-(1-naphthyl)phenyl phenyl carbonate, 4-(2-naphthyl)phenyl phenyl carbonate, di[4-(1-naphthyl)phenyl]carbonate, di[4-(2-naphthyl)phenyl]carbonate, 4-phenoxyphenyl phenyl carbonate, di(4-phenoxyphenyl)carbonate, 3-pentadecylphenyl phenyl carbonate, di(3-pentadecylphenyl)carbonate, 4-tritylphenyl phenyl carbonate, di(4-tritylphenyl) carbonate, methyl salicylate phenyl carbonate, di(methyl salicylate) carbonate, ethyl salicylate phenyl carbonate, di(ethyl salicylate) carbonate, n-propyl salicylate phenyl carbonate, di(n-propyl salicylate) carbonate, isopropyl salicylate phenyl carbonate, di(isopropyl salicylate) carbonate, n-butyl salicylate phenyl carbonate, di(n-butyl salicylate) carbonate, isobutyl salicylate phenyl carbonate, di(isobutyl salicylate) carbonate, tert-butyl salicylate phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tert-butylphenyl)carbonate, biphenyl-4-yl phenyl carbonate, di(biphenyl-4-yl)carbonate, 4-(1-methyl-1-phenylethyl)phenyl phenyl carbonate, di[4-(1-methyl-1-phenylethyl)phenyl]carbonate and di(methyl salicylate) carbonate.

Diphenyl carbonate is very particularly preferred.

It is possible to use either one diaryl carbonate or else various diaryl carbonates.

The diaryl carbonates can also be used with residual contents of the monohydroxyaryl compounds from which they were produced. The residual contents of the monohydroxyaryl compounds can be up to 20% by weight, preferably up to 10% by weight, particularly preferably up to 5% by weight and very particularly preferably up to 2% by weight.

The amount used of the diaryl carbonate(s), based on the dihydroxyaryl compound(s), is generally from 1.02 to 1.30 mol, preferably from 1.04 to 1.25 mol, particularly preferably from 1.045 to 1.22 mol, very particularly preferably from 1.05 to 1.20 mol, per mole of dihydroxyaryl compound. It is also possible to use mixtures of the abovementioned diaryl carbonates, and the molar amounts listed above per mole of dihydroxyaryl compound then refer to the total molar amount of the mixture of the diaryl carbonates.

The monofunctional chain terminators needed to regulate the molecular weight in the interfacial process, an example being phenol or alkylphenols, in particular phenol, p-tert-butylphenol, isooctylphenol, cumylphenol, chlorocarbonic esters of these, or acyl chlorides of monocarboxylic acids or, respectively, mixtures of the said chain terminators, are either introduced to the reaction with the bisphenolate(s) or else are added at any desired juncture of the synthesis process, as long as phosgene or chlorocarbonic acid terminal groups are still present in the reaction mixture or, respectively, in the case of the acyl chlorides and chlorocarbonic esters as chain terminators, as long as there are sufficient phenolic terminal groups available on the polymer that is being formed. However, it is preferable that the chain terminator(s) is/are added after the phosgenation process at a location or at a juncture at which no residual phosgene is present, but the catalyst has not yet been added. As an alternative, they can also be added prior to the catalyst, together with the catalyst, or in parallel.

Branching agents or branching agent mixtures are optionally added in the same manner to the synthesis process. However, branching agents are usually added before the chain terminators. The compounds generally used comprise trisphenols, quaterphenols or acyl chlorides of tri- or tetracarboxylic acids, or mixtures of the polyphenols or of the acyl chlorides. Examples of some of the compounds that are suitable as branching agents, having three or more phenolic hydroxy groups, are phloroglucinol, 4,6-dimethyl-2,4,6-tri(4-hydroxyphenyl)-2-heptene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol, and tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The catalysts preferably used in the interfacial synthesis of polycarbonate are tertiary amines, in particular triethylamine, tributylamine, trioctylamine, N-ethylpiperidine, N-methylpiperidine, N-iso/n-propylpiperidine, quaternary ammonium salts such as tetrabutylammonium hydroxide, chloride, bromide, hydrogensulphate, and tetrafluoroborate, and the corresponding tributylbenzylammonium and tetraethylammonium salts, and also the phosphonium compounds corresponding to these ammonium compounds. These compounds are described in the literature as typical interfacial catalysts and are commercially available and are familiar to the person skilled in the art. The catalysts can be added into the synthesis process individually, in a mixture or else alongside one another or in sequence, also if appropriate prior to the phosgenation process, but preference is given to additions after introduction of the phosgene, except when the catalysts used comprise an onium compound or a mixture of onium compounds. In that case, addition prior to addition of the phosgene is preferred. The catalyst(s) can be added undiluted, in an inert solvent, preferably the solvent for the polycarbonate synthesis, or else in the form of aqueous solution, and in the case of the tertiary amines the addition then takes the form of ammonium salts of these with acids, preferably mineral acids, in particular hydrochloric acid. If a plurality of catalysts are used, or portions of the total amount of catalyst are added, it is also, of course, possible to use different addition methods at different locations or at different times. The total amount used of the catalysts is from 0.001 to 10 mol % based on moles of bisphenols used, preferably from 0.01 to 8 mol %, particularly preferably from 0.05 to 5 mol %.

Catalysts that can be used in the melt-transesterification process to produce polycarbonates are the basic catalysts known from the literature, examples being alkali metal hydroxides and alkaline earth metal hydroxides, alkali metal oxides and alkaline earth metal oxides, and/or onium salts, e.g. ammonium salts or phosphonium salts. It is preferable to use onium salts, particularly preferably phosphonium salts, in the synthesis process. Examples of these phosphonium salts are those of the general formula (IV)

(IV)

in which

R$^{7-10}$ are identical or different, if appropriate substituted, C$_1$-C$_{10}$-alkyl, C$_6$-C$_{14}$-aryl, C$_7$-C$_{15}$-arylalkyl or C$_5$-C$_6$-cycloalkyl moieties, preferably methyl or C$_6$-C$_{14}$-aryl, particularly preferably methyl or phenyl, and X$^-$ is an anion selected from the group of hydroxide, sulphate, hydrogensulphate, hydrogencarbonate, carbonate, halide, preferably chloride, and alkyloxy or aryloxy of the formula —OR$^{11}$, where R$^{11}$ is an, if appropriate substituted, C$_6$-C$_{14}$-aryl, C$_7$-C$_{15}$-arylalkyl or C$_5$-C$_6$-cycloalkyl moiety, or C$_1$-C$_{20}$-alkyl, preferably phenyl.

Particularly preferred catalysts are tetraphenylphosphonium chloride, tetraphenylphosphonium hydroxide and tetraphenylphosphonium phenolate, and very particular preference is given to tetraphenylphosphonium phenolate.

The preferred amounts used of the catalysts, based on one mole of dihydroxyaryl compound, are from $10^{-8}$ to $10^{-3}$ mol, particularly preferably from $10^{-7}$ to $10^{-4}$ mol. It is also optionally possible to use cocatalysts in order to increase the polycondensation rate.

By way of example, these can be alkaline salts of alkali metals and of alkaline earth metals, examples being hydroxides and, if appropriate substituted, C$_1$-C$_{10}$-alkoxides and C$_6$-C$_{14}$-aryloxides of lithium, sodium and potassium, preferably hydroxides and, if appropriate substituted, C$_1$-C$_{10}$-alkoxides or C$_6$-C$_{14}$-aryloxides of sodium. Preference is given to sodium hydroxide, sodium phenolate or the disodium salt of 2,2-bis(4-hydroxyphenyl)propane.

If ions of alkali metals or of alkaline earth metals are introduced in the form of their salts, the amount of ions of alkali metals or of alkaline earth metals, determined by way of example via atomic absorption spectroscopy, is from 1 to 500 ppb, preferably from 5 to 300 ppb and most preferably from 5 to 200 ppb, based on polycarbonate to be formed. However, preferred embodiments of the process according to the invention use no alkali metal salts.

The polycarbonate synthesis process can be carried out continuously or batchwise. The reaction can therefore take place in stirred tanks, tubular reactors, pumped-circulation reactors or stirred-tank cascades or combinations thereof. By using the abovementioned mixing units, it has to be ensured that, as far as possible, separation of the aqueous and organic phase is delayed until complete reaction of the synthesis mixture has taken place, i.e. the mixture comprises no residual hydrolysable chlorine from phosgene or from chlorocarbonic esters.

After introduction of the phosgene in the interfacial process it can be advantageous to mix the organic phase and the aqueous phase for a certain time before, if appropriate, adding branching agent, to the extent that this is not added together with the bisphenolate, and before adding chain terminator and catalyst. This type of after-reaction time can be advantageous after each addition. These continued-stirring times are from 10 seconds to 60 minutes, preferably from 30 seconds to minutes, particularly preferably from 1 to 15 minutes.

The organic phase can be composed of one solvent or of a mixture of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures of these. However, it is also possible to use aromatic hydrocarbons such as benzene, toluene, m/p/o-xylene, or aromatic ethers such as anisole, alone or in a mixture with, or in addition to, chlorinated hydrocarbons. Another embodiment of the synthesis process uses solvents which do not dissolve polycarbonate but merely begin to swell it. It is therefore also possible to use non-solvents for polycarbonate in combination with solvents. The solvents used here can also comprise solvents soluble in the aqueous phase, e.g. tetrahydrofuran, 1,3/1,4-dioxane or 1,3-dioxolane, when the partner solvent forms the second organic phase.

When the at least two-phase reaction mixture has reacted completely and comprises at most residual traces (<2 ppm) of chlorocarbonic esters, it is allowed to settle in order to achieve phase separation. The aqueous alkaline phase may be entirely or to some extent returned in the form of aqueous phase to the polycarbonate synthesis process, or can be passed to waste-water treatment, where solvent content and catalyst content are removed and returned. In another treatment variant, the organic contaminants, in particular solvents and polymer residues, are removed and, if appropriate after adjustment to a particular pH, e.g. via addition of sodium hydroxide solution, the salt is removed and can by way of example be passed to the chloralkali electrolysis process, while the aqueous phase is, if appropriate, returned to the synthesis process.

The organic phase comprising the polycarbonate can then be purified to remove all of the alkaline, ionic or catalytic contaminants. After one or more settling procedures, the organic phase also still comprises some content of the aqueous alkaline phase in the form of fine droplets, and also comprises the catalyst, generally a tertiary amine. The effect of the settling procedures can if appropriate be increased by passing the organic phase through settling tanks, stirred tanks, coalescers or separators or combinations thereof, and it is possible here, if appropriate, to add water in each or some of the separation steps, possibly with use of active or passive mixing units.

After this crude process to remove the alkaline, aqueous phase, the organic phase is washed one or more times with dilute acids, mineral acids, carboxylic acids, hydroxycarboxylic acids and/or sulphonic acids. Preference is given to aqueous mineral acids, in particular hydrochloric acid, phosphorous acid and phosphoric acid and mixtures of the said acids. The concentration of these acids should be in the range from 0.001 to 50% by weight, preferably from 0.01 to 5% by weight.

The organic phase is moreover repeatedly washed with deionized or distilled water. After the individual washing steps, the organic phase, if appropriate with portions of the aqueous phase dispersed, is removed by means of settling tanks, stirred tanks, coalescers or separators or combinations thereof, where the washing water can be added between the washing steps if appropriate with use of active or passive mixing units.

Between the said washing steps, or else after the wash, it is possible if appropriate to add acids, preferably dissolved in the solvent on which the polymer solution is based. It is preferable here to use hydrogen chloride gas and phosphoric acid or phosphorous acid, and these can also optionally be used in the form of mixtures.

Examples of aromatic dicarboxylic acids suitable for the production of the polyester carbonates are phthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, it is particularly preferable to use terephthalic acid and/or isophthalic acid.

Derivatives of the dicarboxylic acids are the diacyl dihalides and the dialkyl dicarboxylates, in particular the diacyl dichlorides and the dimethyl dicarboxylates.

The replacement of the carbonate groups by the aromatic dicarboxylic ester groups takes place in essence stoichiometrically and also quantitatively, and the molar ratio of the reactants is then in turn also found in the finished polyester carbonate. The aromatic dicarboxylic ester groups can be incorporated either randomly or else blockwise.

For the purposes of the invention, examples of $C_1$-$C_4$-alkyl are methyl, ethyl, n-propyl, isopropyl, n-butyl, sec-butyl, and tert-butyl, and examples of $C_1$-$C_6$-alkyl in addition to the above are n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl and 1-ethyl-2-methylpropyl, and examples of $C_1$-$C_{10}$-alkyl in addition to the above are n-heptyl and n-octyl, pinacyl, adamantyl, the isomeric menthyl moieties, n-nonyl and n-decyl, and examples of $C_1$-$C_{34}$-alkyl in addition to the above are n-dodecyl, n-tridecyl, n-tetradecyl, n-hexadecyl and n-octadecyl. The same applies to the corresponding alkyl moiety by way of example in aralkyl and, respectively, alkylaryl, alkylphenyl and alkylcarbonyl moieties. Examples of alkylene moieties in the corresponding hydroxyalkyl and aralkyl and, respectively, alkylaryl moieties are the alkylene moieties corresponding to the above alkyl moieties.

Aryl is a carbocyclic aromatic moiety having from 6 to 34 skeletal carbon atoms. The same applies to the aromatic portion of an arylalkyl moiety, also termed aralkyl moiety, and also to aryl constituents of groups of higher complexity, e.g. arylcarbonyl moieties.

Examples of $C_6$-$C_{34}$-aryl are phenyl, o-, p-, m-tolyl, naphthyl, phenanthrenyl, anthracenyl and fluorenyl.

Each of arylalkyl and, respectively, aralkyl is independently a straight-chain, cyclic, branched or unbranched alkyl moiety as defined above which can have single, multiple or complete substitution by aryl moieties as defined above.

The above lists are given by way of example and are not to be understood as limiting.

For the purposes of the present invention, ppb and ppm mean parts by weight—unless otherwise stated.

Component B

Component B encompasses one or more graft polymers of
B.1 from 5 to 95% by weight, preferably from 20 to 90% by weight, particularly preferably from 30 to 60% by weight, of at least one vinyl monomer
B.2 from 95 to 5% by weight, preferably from 80 to 10% by weight, particularly preferably from 70 to 40% by weight, of one or more graft bases with glass transition temperatures <10° C., preferably <0° C., particularly preferably <−20° C.

The median particle size (d50 value) of the graft base B.2 is generally from 0.05 to 10.00 μm, preferably from 0.10 to 5.00 μm, more preferably from 0.20 to 1.00 μm, and particularly preferably from 0.25 to 0.50 μm.

Monomers B.1 are preferably mixtures made of
B.1.1 from 50 to 99 parts by weight of vinylaromatics and/or of ring-substituted vinylaromatics (e.g. styrene, α-methylstyrene, p-methylstyrene, p-chlorostyrene) and/or C1-C8-alkyl(meth)acrylates, e.g. methyl methacrylate, ethyl methacrylate, and
B.1.2 from 1 to 50 parts by weight of vinyl cyanides (unsaturated nitriles, such as acrylonitrile and methacrylonitrile) and/or C1-C8-alkyl(meth)acrylates, such as methyl methacrylate, n-butyl acrylate, tert-butyl acrylate, and/or derivatives (such as anhydrides and imides) of unsaturated carboxylic acids, for example maleic anhydride.

Preferred monomers B.1.1 are those selected from at least one of the monomers styrene, α-methyl-styrene and methyl methacrylate, and preferred monomers B.1.2 are those selected from at least one of the monomers acrylonitrile, maleic anhydride and methyl methacrylate. Particularly preferred monomers are B.1.1 styrene and B.1.2 acrylonitrile.

Examples of suitable graft bases B.2 for the graft polymers B are diene rubbers, EP(D)M rubbers, i.e. those based on ethylene/propylene and optionally diene, acrylate rubbers, polyurethane rubbers, silicone rubbers, and chloroprene and ethylene/vinyl acetate rubbers.

Preferred graft bases B.2 are diene rubbers, for example those based on butadiene and isoprene, or are mixtures of diene rubbers or are copolymers of diene rubbers or of their mixtures with other copolymerizable monomers (e.g. according to B.1.1 and B.1.2), with the proviso that the glass transition temperature of component B.2 is below <10° C., preferably <0° C., particularly preferably <−10° C. Particular preference is given to pure polybutadiene rubber.

The glass transition temperature is determined by means of differential scanning calorimetry (DSC) to DIN EN 61006 using a heating rate of 10 K/min with determination of Tg by the midpoint method (tangent method).

Examples of particularly preferred polymers B are ABS polymers (emulsion ABS, bulk ABS and suspension ABS), as described by way of example in DE-A 2 035 390 (=U.S. Pat. No. 3,644,574) or in DE-A 2 248 242 (=GB Patent 1 409 275) or in Ullmanns Enzyklopädie der Technischen Chemie [Ullmann's Encyclopaedia of Industrial Chemistry], Volume 19 (1980), pp. 280 ff. The proportion of gel in the graft base B.2 is at least 30% by weight, preferably at least 40% by weight (measured in toluene).

The graft copolymers B are produced via free-radical polymerization, e.g. via emulsion polymerization, suspension polymerization, solution polymerization or bulk polymerization, preferably via emulsion polymerization or bulk polymerization, particularly preferably via emulsion polymerization.

Other particularly suitable graft rubbers are ABS polymers, where these are produced in the emulsion-polymerization process via redox initiation using an initiator system made of organic hydroperoxide and ascorbic acid according to U.S. Pat. No. 4,937,285.

Since, as is known, the graft reaction does not necessarily provide complete grafting of the graft monomers onto the graft base, graft polymers B are understood according to the invention to include those products obtained via (co)polymerization of the graft monomers in the presence of the graft base, where these arise concomitantly during work-up.

Suitable acrylate rubbers according to B.2 of the polymers B are preferably polymers made of alkyl acrylates, optionally with up to 40% by weight, based on B.2, of other polymerizable, ethylenically unsaturated monomers. Among the preferred polymerizable acrylates are C1 to C8-alkyl esters, such as methyl ester, ethyl ester, butyl ester, n-octyl ester and 2-ethylhexyl ester; and haloalkyl esters, preferably halo-C1-C8-alkyl esters, such as chloroethyl acrylate, and also mixtures of the said monomers.

Monomers having more than one polymerizable double bond can be copolymerized for the crosslinking process. Preferred examples of crosslinking monomers are esters of unsaturated monocarboxylic acids having from 3 to 8 carbon atoms and of unsaturated monohydric alcohols having from 3 to 12 carbon atoms, or are saturated polyols having from 2 to 4 OH groups and from 2 to 20 carbon atoms, e.g. ethylene glycol dimethacrylate, allyl methacrylate; polyunsaturated heterocyclic compounds, such as trivinyl cyanurate and triallyl cyanurate; polyfunctional vinyl compounds, such as di- and trivinylbenzenes; and also triallyl phosphate and diallyl phthalate. Preferred crosslinking monomers are allyl methacrylate, ethylene glycol dimethacrylate, diallyl phthalate and heterocyclic compounds, where these have at least three ethylenically unsaturated groups. Particularly preferred crosslinking monomers are the cyclic monomers triallyl cyanurate, triallyl isocyanurate, triacryloylhexahydro-s-triazine, and triallylbenzenes. The amount of the crosslinked monomers is preferably from 0.02 to 5.00% by weight, in particular from 0.05 to 2.00% by weight, based on the graft base B.2. In the case of cyclic crosslinking monomers having at least three ethylenically unsaturated groups, it is advantageous to restrict the amount to below 1% by weight of the graft base B.2.

Examples of preferred "other" polymerizable, ethylenically unsaturated monomers which can optionally serve alongside the acrylates for producing the graft base B.2 are acrylonitrile, styrene, α-methylstyrene, acrylamides, vinyl C1-C6-alkyl ethers, methyl methacrylate, and butadiene. Preferred acrylate rubbers as graft base B.2 are emulsion polymers which have at least 60% by weight gel content.

Other suitable graft bases according to B.2 are silicone rubbers which have graft-active sites and are described in DE-A 3 704 657, DE-A 3 704 655, DE-A 3 631 540 and DE-A 3 631 539.

The gel content of the graft base B.2 is determined in a suitable solvent at 25° C. (M. Hoffmann, H. Krömer, R. Kuhn, Polymeranalytik I und II [Polymer analysis I and II], Georg Thieme-Verlag, Stuttgart 1977).

The median particle size d50 is the diameter above and below which respectively 50% by weight of the particles lie. It can be determined by means of ultracentrifuge measurement (W. Scholtan, H. Lange, Kolloid, Z. und Z. Polymere 250 (1972), 782-1796).

Component C

Examples of suitable pigments (component C) are titanium dioxide, talc, calcium carbonate, barium sulphate, zinc sulphide, zinc oxide, iron oxide, chromium oxide, other organic and inorganic colour pigments, graphite, graphene, carbon nanotubes, phyllosilicates, carbon black. Suitable organic and inorganic pigments are described in Ullmann's Encyclopedia of Industrial Chemistry, Wiley-VCH, 7$^{th}$ Edition 2010. Suitable types of carbon black are described in Ullmann's Encyclopedia of Industrial Chemistry, Chapter 6. Carbon black, Wiley-VCH, 7$^{th}$ Edition 2010.

Carbon blacks that can be used according to the invention can be produced by the furnace-black process, the gas-black process or the lamp-black process, preferably by the furnace-black process. The primary particle size is from 10 to 100 nm, preferably from 20 to 60 nm, and the grain size distribution can be narrow or broad. The BET surface area according to DIN 53601 is from 10 to 600 m$^2$/g, preferably from 70 to 400 m$^2$/g. The carbon black particles can have been oxidatively post-treated in order to establish surface functionalities. They can have been rendered hydrophobic (an example being Black Pearls 800 from Cabot or Printex 85 or lamp black 101 from Evonik Degussa GmbH) or hydrophilic (an example being FW20 pigment black or Printex 150 T from Evonik Degussa GmbH). They can have a high or low level of structuring; this describes the aggregation state of the primary particles.

Improved metering capability can be achieved by using pelletized carbon blacks.

Component D

The polymer mixtures according to the invention can moreover comprise other additives (component D), e.g. flame retardants, heat stabilizers, antioxidants, UV stabilizers and/or mould-release agents.

Suitable additives are described by way of example in "Additives for Plastics Handbook, John Murphy, Elsevier, Oxford 1999", in "Plastics Additives Handbook, Hans Zweifel, Hanser, Munich 2001".

Phosphorus-containing flame retardants are preferably those selected from the groups of the mono- and oligomeric phosphoric and phosphonic esters, phosphonate amines and phosphazenes, and it is also possible here to use, as flame retardants, mixtures of a plurality of components selected from one or more of these groups. It is also possible to use other halogen-free phosphorus compounds not specifically mentioned here, either alone or in any desired combination with other halogen-free phosphorus compounds.

The phosphorus compounds are known (cf. e.g. EP-A 0 363 608, EP-A 0 640 655) or can be produced by analogous use of known methods (e.g. Ullmanns Enzyklopädie der technischen Chemie [Ullmann's Encylopaedia of Industrial Chemistry], Volume 18, pp. 301 ff. 1979; Houben-Weyl, Methoden der organischen Chemie [Methods of organic chemistry], Volume 12/1, p. 43; Beilstein Volume 6, p. 177).

It is also possible to use, as flame retardants, the phosphonate amines and phosphazenes described in WO 00/00541 and WO 01/18105.

The flame retardants can be used alone or in any desired mixture with one another or in a mixture with other flame retardants.

Mould-release agents that are preferably suitable are those selected from the group consisting of pentaerythritol tetrastearate, glycerol monostearate, long-chain fatty acid esters, such as stearyl stearate and propanediol stearate, and mixtures of these. The amounts used of the mould-release agents are from 0.05% by weight to 2.00% by weight, based on the moulding composition, preferably from 0.1% by weight to 1.0% by weight, particularly preferably from 0.15% by weight to 0.60% by weight and very particularly preferably from 0.2% by weight to 0.5% by weight, based on the moulding composition.

Examples of suitable antioxidants or heat stabilizers are:
alkylated monophenols, alkylthiomethylphenols, hydroquinones and alkylated hydroquinones, tocopherols, hydroxylated thiodiphenyl ethers, alkylidene bisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Preference is given to organic phosphines (e.g. triphenylphosphine), phosphites (Irgafos 168), phosphonates and phosphates (e.g. triisooctyl phosphate, TOF), mostly to those in which the organic moieties are composed entirely or to some extent of, if appropriate substituted, aromatic moieties. The amounts preferably used of these additives are from 10 to 2000 mg/kg, preferably from 30 to 800 mg/kg, particularly preferably from 50 to 500 mg/kg, based on the total weight of the composition.

Specifically in the case of pale-coloured products and those having low pigment level, it can be advisable to use UV stabilizers. The following materials are suitable UV stabilizers: 2-(2'-hydroxyphenyl)benzotriazoles, 2-hydroxybenzophenones, esters of substituted and unsubstituted benzoic acids, acrylates, sterically hindered amines, oxamides, and also 2-(hydroxyphenyl)-1,3,5-triazines and, respectively, substituted hydroxyalkoxyphenyl, 1,3,5-triazoles, preference being given to substituted benzotriazoles, e.g. 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-tert-butylphenyl)-5-chlorobenzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5",6"-tetrahydrophthalimidoethyl)-5'-methylphenyl]benzotriazole and 2,2'-methylenebis[4-(1,1,3,3-tetramethylbutyl)-6-(2H-benzotriazol-2-yl)phenol].

Other suitable UV stabilizers are those selected from the group consisting of benzotriazoles (e.g. Tinuvin products from Ciba), triazine CGX-06 from Ciba), benzophenones (Uvinul products from BASF), cyanoacrylates (Uvinul products from BASF), cinnamic esters and oxanilides, and also mixtures of these UV stabilizers.

Particularly preferred UV stabilizers for the moulding compositions according to the invention are compounds from the group consisting of the benzotriazoles and dimeric benzotriazoles, the malonic esters and the cyanoacrylates, and also mixtures of the said compounds.

The amounts used of the UV stabilizers are from 0.01% by weight to 2.0% by weight, based on the moulding composition, preferably from 0.05% by weight to 1.00% by weight, particularly preferably from 0.08% by weight to 0.5% by weight and very particularly preferably from 0.1% by weight to 0.4% by weight, based on the entire composition.

Polypropylene glycols can be used alone or in combination with, for example, sulphones or sulphonamides as stabilizers to counter damage due to gamma-rays.

The apparatus for producing the abovementioned polymer mixtures according to the invention is characterized in that the said apparatus is composed of a corotating twin- or multiscrew extruder. The detailed design of the extruder screws here is characterized in that, at least starting from the plastifying zone of the extruder and the zones subsequent thereto in the direction of conveying, as far as the polymer-melt discharge at the die plate, the ratio between external screw diameter and internal barrel diameter is smaller than 98.4%. It is preferable that the ratio between external screw diameter and internal barrel diameter is within the range from greater than or equal to 90.4% to smaller than 98.4%. It is particularly preferable that the ratio between external screw diameter and internal barrel diameter is in the range from greater than or equal to 92.6% to smaller than 98.4%, preferably 98.2%. It is particularly preferable that the ratio between external screw diameter and internal barrel diameter is in the range from greater than or equal to 96.4% to smaller than 98.4%, preferably 98.2%. The sum of external screw diameter and screw root diameter divided by twice the axial separation is smaller than 99.1%. It is preferable that the sum of external screw diameter and screw root diameter divided by twice the axial separation is greater than or equal to 94.2% and smaller than 99.1%. It is particularly preferable that the sum of external screw diameter and screw root diameter divided by twice the axial separation is from greater than or equal to 95.6% to smaller than 99.1%. It is particularly preferable that the sum of external screw diameter and screw root diameter divided by twice the axial separation is greater than or equal to 97.9% and smaller than 99.1%. This gives, in comparison with the prior art described by way of example in DE 10 2004 010 553 A1, enlarged gaps between external screw diameter and barrel wall section, and also between screw flight land and screw root surface of the opposite screw. According to the invention, a longitudinal proportion of at least 50% of the screw in the region starting from the plastifying zone of the extruder and the zones subsequent thereto in the direction of conveying, as far as the polymer-melt discharge at the die plate, must be within the stated range for the ratio between external screw diameter and internal barrel diameter and also within the stated range for the sum of external screw diameter and screw root diameter divided by twice the axial separation. It is preferable that a longitudinal proportion of at least 75%, and particularly preferable that a longitudinal proportion of at least 90%, of the screw, based on the barrel section associated with the respective screw element, is within the said ranges.

In one very preferred embodiment, there is, in the region starting from the plastifying zone and the zones subsequent thereto in the direction of conveying, as far as the polymer-melt discharge at the die plate, at least one conveying element and/or at least one kneading element which exhibits/exhibit the abovementioned ratios between external screw diameter and internal barrel diameter and sum of external screw diameter and screw root diameter divided by twice the axial separation. In this context it is possible that either at least one conveying element or at least one kneading element, or not only at least one conveying element but also at least one kneading element, exhibits/exhibit the abovementioned ratios. It is particularly preferable that either at least one conveying element or not only at least one conveying element but also at least one kneading element exhibits/exhibit the abovementioned ratios.

From the ratio between external screw diameter and internal barrel diameter, it is possible to calculate gap widths between screw flight land and extruder barrel wall section (dl in FIG. 1), by using relationships known to the person skilled in the art.

The person skilled in the art can determine the gap between the external diameter of one of the screws and the root diameter of the other screw (d2 in FIG. 1) from the data described, given knowledge of the axial separation of the two screws.

Figure 2:
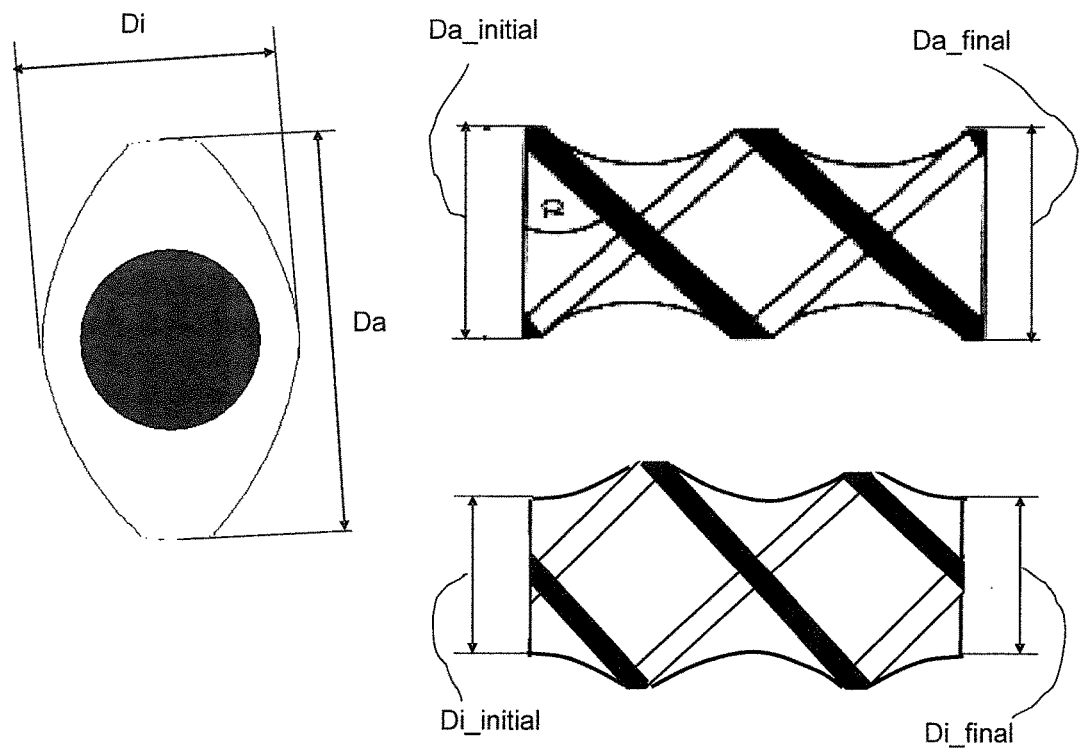

External screw diameter (Da in FIG. 2) and screw root diameter (Di in FIG. 2) are determined by calliper gauge at the initial and final ends of each screw element (Da_initial and Da_final and Di_initial and Di_final in FIG. 2). The two values Da_initial and Da_final are averaged. The resultant average value is termed the external diameter of the screw element. The two values Di_initial and Di_final are averaged. The resultant average value is termed the root diameter of the screw element.

Figure 3:
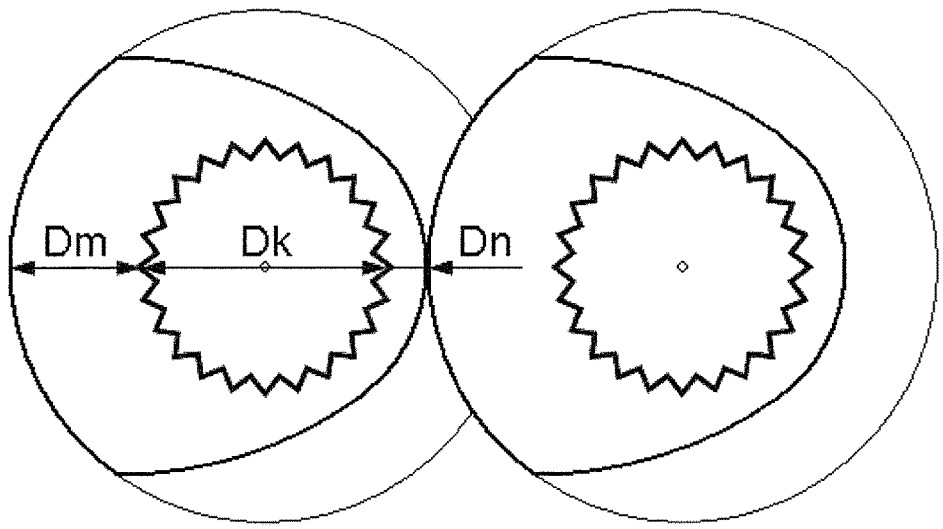

For single-flight conveying and kneading elements, there is a different prescribed method for determining the external screw diameter and the screw root diameter (see FIG. 3), as follows: at the tip of the single-flight element, the (distal tooth) diameter Dk of the inner system of teeth is determined, as also is the separation Dm between the inner system of teeth and the screw flight land. The external diameter Da of the single-flight screw element is then $Da$(single-flight element)=$2\times(Dk/2+Dm)$.

To determine the root diameter Di, the (distal tooth) diameter Dk of the inner system of teeth is determined at the tip of the element, as also is the separation Dn between the inner system of teeth and the screw root. The root diameter is then $Di$(single-flight element)=$2\times(Dk/2+Dn)$.

Figure 4:
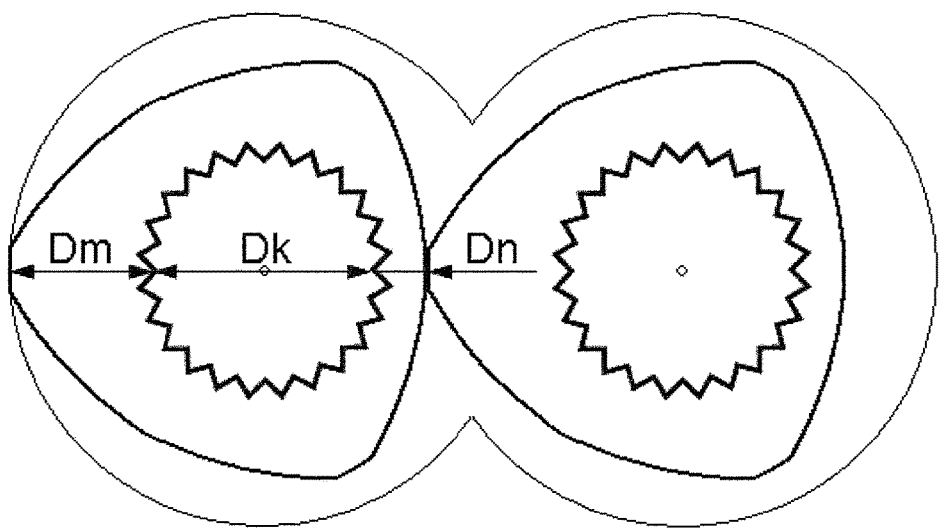

For eccentric triple-flight kneading elements, the prescribed method for determining the external screw diameter and the screw root diameter (see FIG. 4) is different, as follows: at the tip of the triple-flight element, the (proximal tooth) diameter Dk of the inner system of teeth is determined, as also is the separation Dm between the inner system of teeth and the screw flight land which scours the barrel. The external diameter Da of the triple-flight screw element is then $Da$(ecc. triple-flight element)=$2\times(Dk/2+Dm)$.

To determine the root diameter Di, the (proximal tooth) diameter Dk of the inner system of teeth is determined at the tip of the element, as also is the separation Dn between the inner system of teeth and the screw root which is opposite to the screw flight land which scours the barrel. The root diameter is then $Di$(ecc. triple-flight element)=$2\times(Dk/2+Dn)$.

Dk, Dm and Dn (see FIG. 3 for a single-flight element or FIG. 4 for an eccentric triple-flight element) are measured by means of a calliper gauge at the initial and final ends of each screw element, and the respective values of Da (single-flight element or eccentric triple-flight element) and Di (single-flight element or eccentric triple-flight element) are calculated therefrom for the initial and final ends of the screw element. The two values Da_initial and Da_final are averaged. The average value thus determined is termed the external diameter of the screw element. The two values Di_initial and Di_final are averaged. The average value thus determined is termed the root diameter of the screw element.

Figure 5:
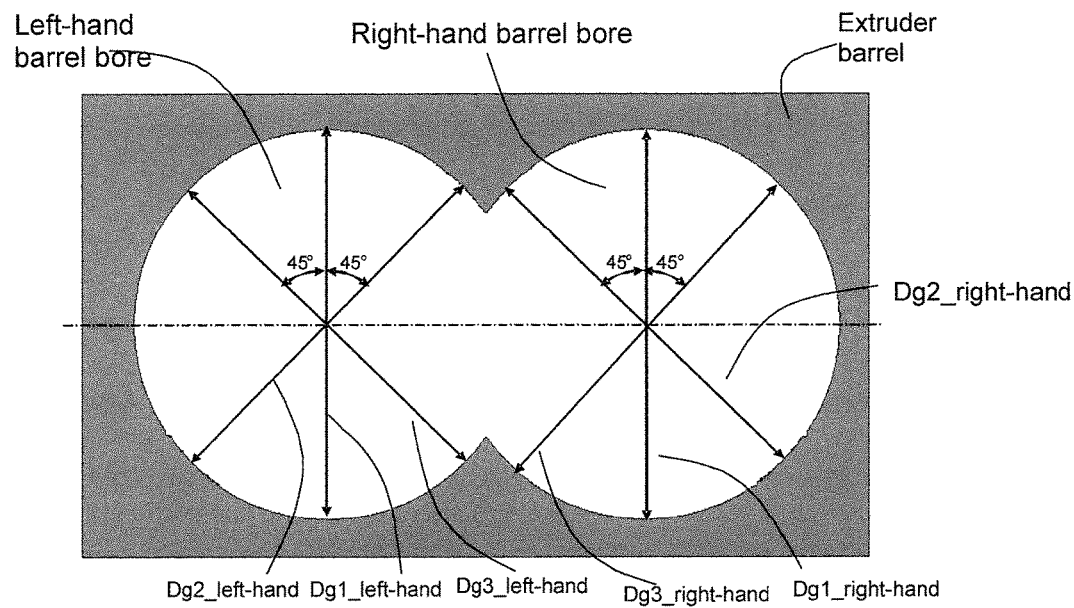
Figure 6:
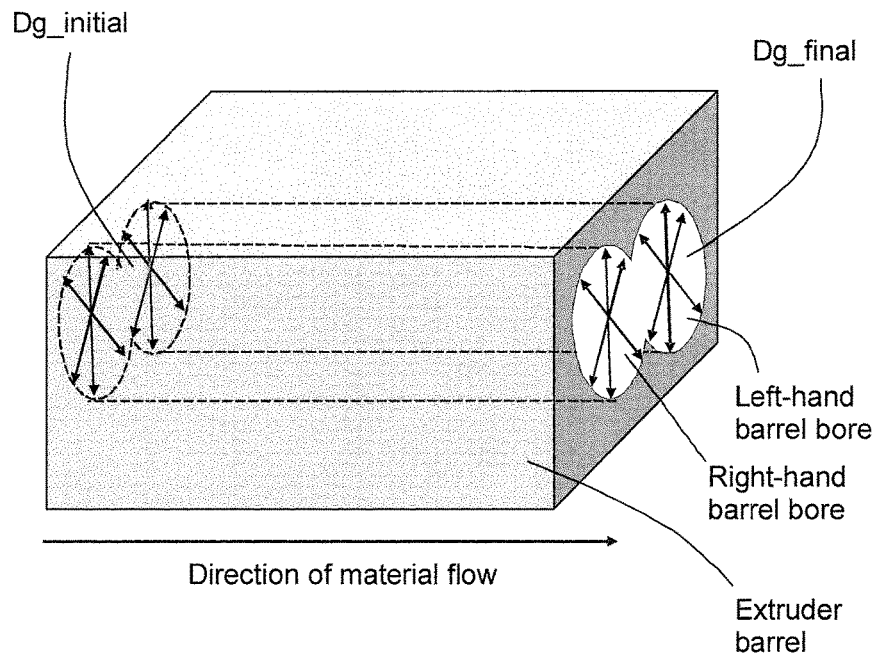

The internal barrel diameter is measured on each barrel section, for the left-hand and right-hand bore, in each case at three positions displaced by 45° (Dg1_left-hand, Dg2_left-hand, Dg3_left-hand, Dg1_right-hand, Dg2_right-hand, Dg3_right-hand in FIG. 5) on the periphery of the barrel section by means of a calliper gauge, respectively directly at the initial end (Dg_initial in FIG. 6) and directly at the final end of the barrel section (Dg_final in FIG. 6), correspondingly for the right-hand and the left-hand screw. For each barrel section, the arithmetic average value is calculated from the six values of Dg_initial (Dg1_left-hand, Dg2_left-hand, Dg3_left-hand, Dg1_right-hand, Dg2_right-hand and Dg3_right-hand in FIG. 3) and from the six values of Dg_final (Dg1_left-hand, Dg2_left-hand, Dg3_left-hand, Dg1_right-hand, Dg2_right-hand and Dg3_right-hand in FIG. 5). This average value is termed the internal barrel diameter.

From the ratio between external screw diameter and internal barrel diameter, it is possible to calculate gap widths between screw flight land and extruder barrel wall section (dl in FIG. 1), by using relationships known to the person skilled in the art.

The person skilled in the art can determine the gap between the external diameter of one of the screws and the root diameter of the other screw (d2 in FIG. 1) from the data described, given knowledge of the axial separation of the two screws.

The gap widths according to the invention are therefore markedly larger than those of the prior art as described by way of example in DE 10 2004 010 553 A1, where the gap between the screw flight lands and the barrel, and also the gap between the screw flight land and the screw root of the opposite screw, are markedly smaller than 1%, based on the diameter of the barrel bore.

In suitable extruders, the ratio between the length of the extruder screw and the diameter of the extruder screw is in the range from 20 to 50 and the diameter of the barrel bores is from 18 mm to 180 mm. The screw elements in the plastifying zone, melt-conveying zone and mixing zone of the twin-screw extruder are conveying elements, kneading elements and mixing elements. Examples of mixing elements are toothed mixing elements; they are described by way of example in the book "Der gleichläufige Doppelschneckenextruder" [The corotating twin-screw extruder] by Klemens Kohlgrüber, ISBN 978-3-446-41252-1 (Chapter 12.3.4). Examples of kneading elements are kneading discs with various displacement angles between the discs and with various disc widths; they are described by way of example in the book "Der gleichläufige Doppelschneckenextruder" [The corotating twin-screw extruder] by Klemens Kohlgrüber, ISBN 978-3-446-41252-1 (Chapter 12.3.2). The conveying elements are by way of example single-flight, double-flight or triple-flight tightly intermeshing screw-thread elements with various pitches and flight depths; they are described by way of example in the book "Der gleichläufige Doppelschneckenextruder" [The corotating twin-screw extruder] by Klemens Kohlgrüber, ISBN 978-3-446-41252-1 (Chapter 12.3.1).

Suitable twin- or multiscrew extruders have suitable metering locations for the substances being mixed within the extruder, and these are at least one, or else optionally more than one, feed hopper at at least one of the extruder barrel sections prior to the plastifying zone. It is also possible that, instead of a feed hopper, there are any desired openings in the barrel section, for any desired conveying equipment, at at least one of the extruder barrel sections prior to the plastifying zone. The substances to be mixed can be introduced either together or separately into the extruder, at one or more metering locations. The forms in which they, and also the pigments, are metered into the twin-screw extruder can be that of powder mixtures in one of the other polymer-mixture components that takes the form of powder. It is preferable that all of the components are metered together by way of a hopper at the first extruder barrel section—seen in the direction of conveying—optionally by way of a plurality of weighing systems (pellets 1, pellets 2, premix).

The rotation rates of the extruder screws can vary within a wide range from 50 to 1200 rpm, preference being given to rotation rates in the range from 100 to 700 rpm in order to restrict energy input into the polymer melt and thus the increase in temperature thereof.

The invention further provides a process for producing the polymer mixtures according to the invention with use of the apparatus described above, where the components are preferably mixed with one another in a single melting step without any use of pigment masterbatches premixed in the melt, and with minimum energy input.

The metered addition of the constituents of the mixture takes place at suitable metering locations by way of at least one, or else optionally more than one, feed hopper at at least one of the extruder barrel sections prior to the plastifying zone. It is also possible that, instead of a feed hopper, there are any desired openings in the barrel section, for any desired conveying equipment, at at least one of the extruder barrel sections prior to the plastifying zone. The substances to be mixed can be introduced either together or separately into the extruder, at one or more metering locations. The forms in which they, and also the pigment, preferably carbon black, are metered into the twin-screw extruder can be that of powder mixtures in one of the other polymer-mixture components that takes the form of powder. It is preferable that all of the components are metered together by way of a hopper at the first extruder barrel section—seen in the direction of conveying—optionally by way of a plurality of weighing systems (pellets 1, pellets 2, premix).

The rotation rates of the extruder screws can vary within a wide range from 50 to 1200 rpm, preference being given to rotation rates in the range from 100 to 700 rpm in order to restrict energy input into the polymer melt and thus the increase in temperature thereof. The rotation rates and the throughputs are preferably adjusted in such a way that the temperature of the polymer melt at the exit from the extruder die is not higher than 320° C., preferably being below 300° C. and particularly preferably below 290° C.

The polymer mixtures produced according to the invention can be processed in the melt via thermoplastic processing to give mouldings or extrudates, in customary apparatuses. It is preferable to produce mouldings via injection moulding and via extrusion.

Any defects occurring on gloss surfaces of injection mouldings thus produced in injection moulds with gloss polish (ISO N1) can be identified and quantified by optical analysis methods, and all of the defect sites with average diameter of at least 10 μm are included here in determining the number of surface defects. A suitable test method for quantitative recording of surface defects is observation of the surfaces of the mouldings under a reflected-light microscope—e.g. motorized Zeiss Axioplan 2—through an objective providing magnification of 2.5 in bright-field mode, with illumination by a halogen-100 light source. The number of defects in a region measuring 4 cm×4 cm of the surface was determined here by using an undulating scan pattern on the said area. This determination method also used a camera—e.g. Axiocam HRC—with image-evaluation software—e.g. Zeiss KS 300.

Figure 7:
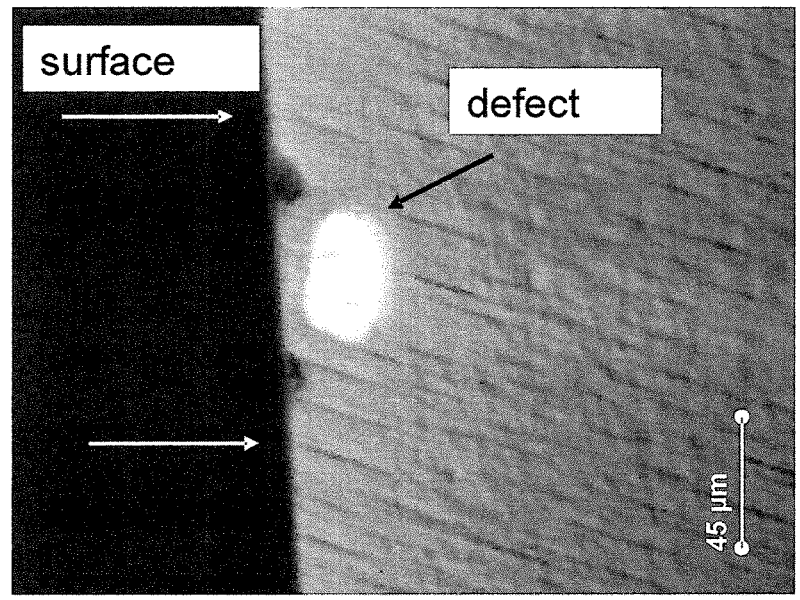

The surface defects detected by this optical method on mouldings made of polymer mixtures using the abovementioned compositions are generated by agglomerates and aggregates made of pigments, in particular carbon black particles, where these are insufficiently comminuted during mixing of the components in the melt within the extruder. Surface defects can also be caused by elastomers or by a combination of elastomers and pigment particles. These surface defects are rendered clearly visible by reflected-light microscopy on suitable sections of specimens of the material. The average diameter of these surface defects is usually from about 10 μm to about 300 μm (see FIG. 7). Raman spectroscopy can be used to demonstrate that the particles are carbon (see FIG. 8). The height profile of a surface defect is determined via CLSM topography. For this measurement, a Leica TCS NT microscope with an NA 0.55 40× objective was used. The wavelength of the laser used is 488 nm. The number of sections measured was 63, overall section depth being 12.6 μm. "Topo" software with profile measurement was used for the evaluation process. FIG. 9 shows the dimensions of a typical surface defect in terms of depth.

The number of surface defects on mouldings made of polymer mixtures produced according to the invention on self-purging corotating twin-screw extruders is significantly reduced when comparison is made with surface defects on mouldings of polymer-melt mixtures produced with identical extruder-screw configuration but with customary narrow gap width over the entire length of the extruder screws. The enlargement of the gap according to the invention leads firstly not only to improved comminution (dispersion) of pigment agglomerates and of pigment aggregates and to improved distribution of the pigment particles, and also of the elastomers present, but also to a marked improvement in surface quality with somewhat lower energy input. Secondly, it is possible to lower the energy input markedly and to compound the product under substantially less aggressive conditions, without any change in surface quality.

The polymer mixtures produced according to the invention are preferably used for producing injection mouldings or extrudates, where these are subject to particular requirements for homogeneity and freedom from defects on the surfaces.

Examples of the mouldings according to the invention are profiles, foils, casing parts of any type, in particular casing parts for computers, laptops, cell phones, television frames; for office machinery, such as monitors, printers, copiers; for sheets, pipes, electrical-installation ducts, windows, doors and profiles for the construction sector, the fitting-out of interiors, and outdoor applications; in the field of electrical engineering, e.g. for switches and plugs. The mouldings according to the invention can moreover be used for the interior fittings and other components in rail vehicles, in ships, in aircraft, in buses and in other motor vehicles, and also for motor-vehicle-bodywork parts. Other mouldings are food-and-drink packaging and components which are metallized or galvanized after the injection-moulding process.

FIG. 1: Terminology for gap in a twin-screw extruder.

FIG. 2: Measurement locations for determining external screw diameter Da and internal screw diameter Di
left-hand side: cross section of a screw element;
right-hand side, above: side view of a screw element;
right-hand side, below: side view of a screw element rotated by 90° in comparison with the screw element right-hand side above FIG. 3: Measurement locations for determining external screw diameter and internal screw diameter of a single-flight element or kneading block FIG. 4: Measurement locations for determining external screw diameter and internal screw diameter of a triple-flight element or kneading block FIG. 5: Measurement locations for determining internal barrel diameter FIG. 6: Measurement locations for determining internal barrel diameter FIG. 7: Optical micrograph of a carbon black agglomerate in the context of surface defects.

Figure 8:
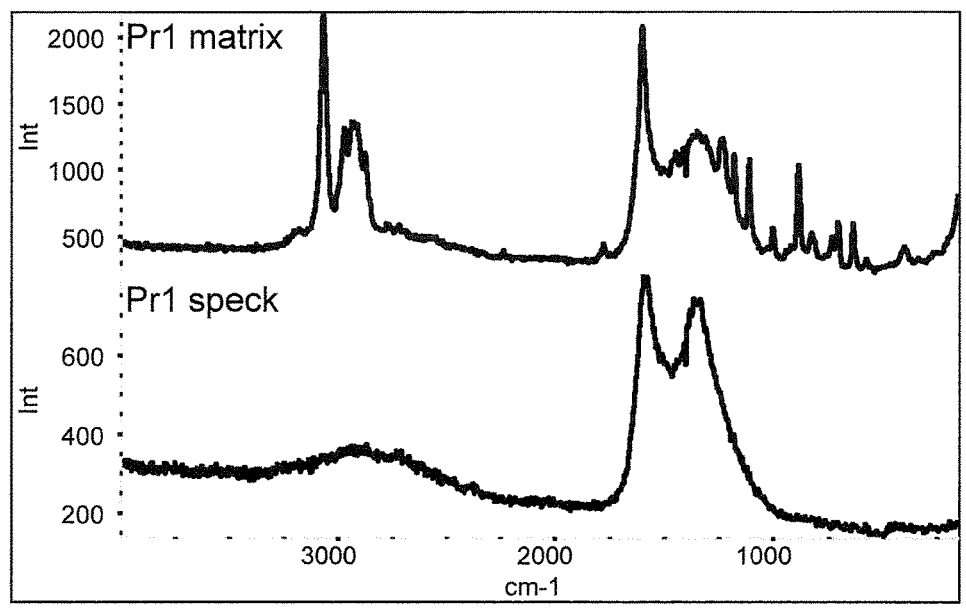
Figure 9:
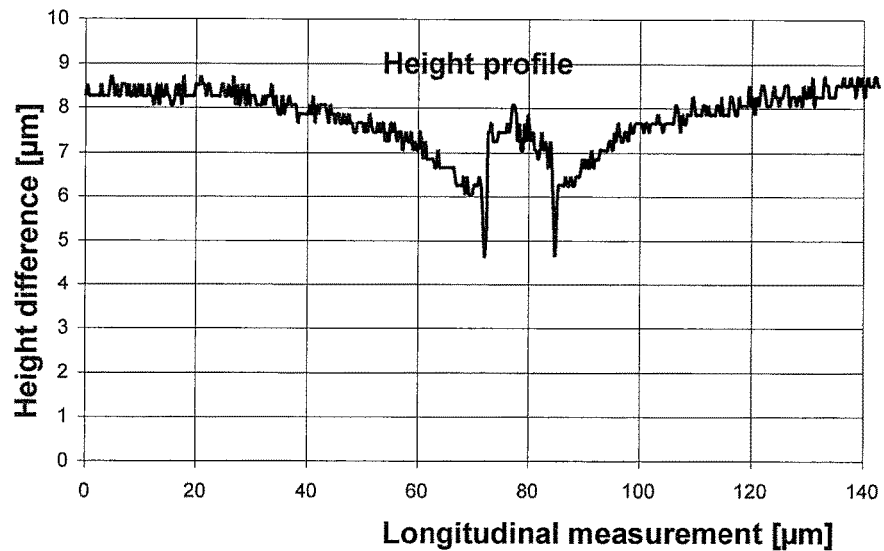

FIG. 8: Raman spectroscopy image of a carbon black agglomerate.

FIG. 9: Use of CLSM to study dimensions of a carbon black agglomerate.

Figure 10:
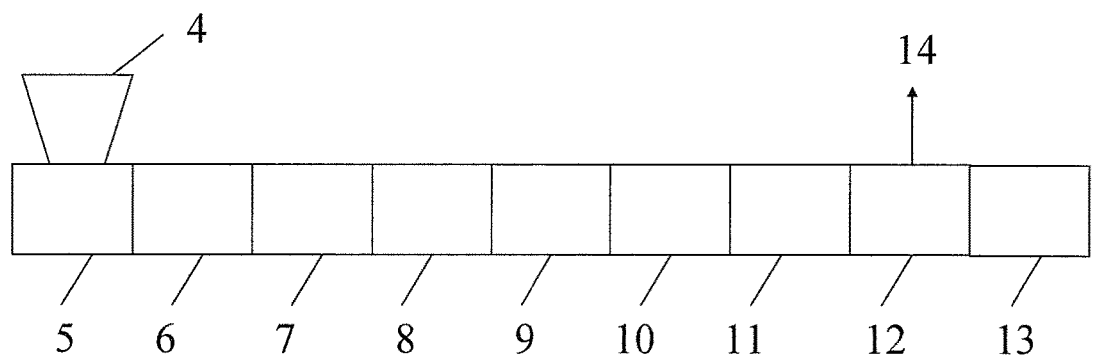

FIG. 10: Extruder structure.

Figure 11:
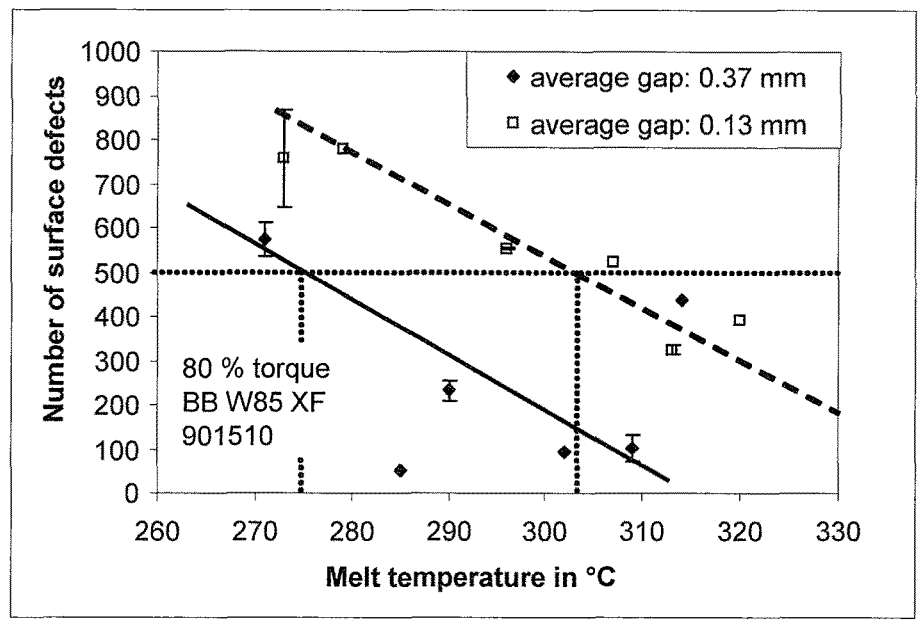

FIG. 11: Number of surface defects as a function of melt temperature at various gap sizes.

Figure 12:
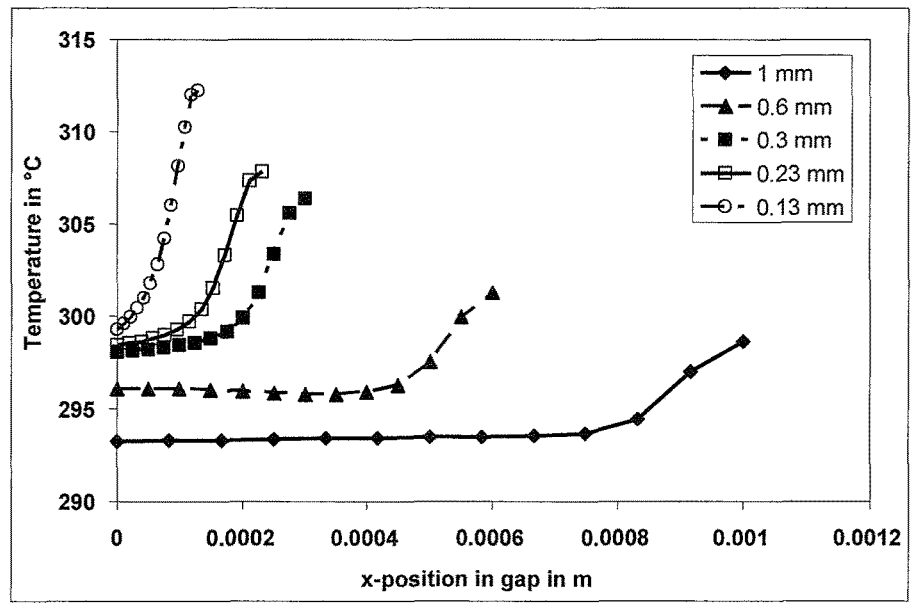

FIG. 12: Simulation calculation for determining local temperature peaks within the gap at various gap sizes.

Figure 13:
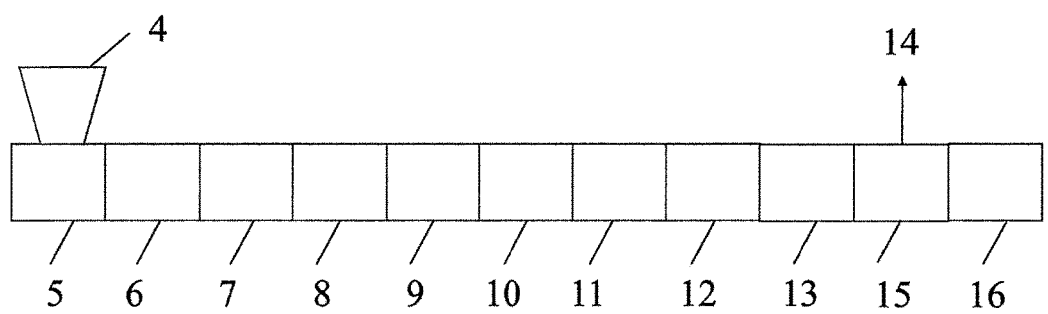

FIG. 13: Extruder structure.

The examples below are intended to illustrate the invention, but without restricting the invention to the content of the examples.

EXAMPLES

The experiments described in examples 1-15 were carried out using an Evolum HT32 twin-screw extruder from Clextral. The twin-screw extruder used has an internal barrel diameter of 32 mm and a length-to-diameter ratio of 36. FIG. 10 shows the principles of the structure of the extruder used. The twin-screw extruder has a barrel composed of 9 parts, and within this barrel there are two corotating, mutually intermeshing screws (not shown) arranged.

The metered addition of all of the components took place by way of the main intake into barrel section 5, at the intake opening 4 depicted. In barrel part 12 there is the vent 14, attached to a suction apparatus (not shown).

In the region of barrel sections 5 to 9 there are conveying zones for the pellets.

In the region of barrel sections 10 and 11 there is a plastifying zone, which is composed of various double- and triple-flight kneading blocks of varying width, and of retarder elements.

In the region of barrel sections 11 and 12 there is a mixing zone, which is composed of various mixing and conveying elements.

In barrel section 13 there is the pressurizing zone and, following that, a die plate with 6 holes.

FIG. 1 shows a cross section through the extruder used. The extruder barrel is indicated by 1. In the interior of the barrel there are two corotating, mutually intermeshing screws. The right-hand screw is indicated by 2, and the left-hand screw is indicated by 3. The gap between the inner wall of the barrel and the screw is termed d1. The gap between the two screws is d2. The torque was set at 80% (273 Nm) in all of the experiments.

Polycarbonate powder, carbon black and all of the other additives were premixed in a mixer from Mixaco.

The pelletization process used was strand pelletization after water-bath cooling.

The melt temperature was measured by insertion of a thermometer into the emerging melt of the, seen from outside, third melt strand, directly prior to the die.

Specific energy input was determined according to equation 1.

$$E_{spec} = \frac{2 \cdot \pi \cdot M \cdot n}{\dot{m} \cdot 60000} \qquad \text{Eq. 1}$$

$E_{spec}$: specific energy input in kWh/kg
M: torque in Nm
n: rotation rate in rpm
m: throughput in kg/h The experiments described in examples 17-24 were carried out with a ZSK 32 MC twin-screw extruder from Coperion. The internal barrel diameter of the twin-screw extruder used is 32.0 mm and its length:diameter ratio is 43.3. FIG. 13 shows the principles of the structure of the extruder used. The twin-screw extruder has a barrel composed of 11 sections, in which 2 corotating intermeshing screws have been arranged (not shown).

The metered addition of all of the components took place by way of the main intake into barrel section 5, at the intake opening 4 depicted. In barrel part 15 there is the vent 14, attached to a suction apparatus (not shown).

In the region of barrel sections 5 to 11 there are conveying zones for the pellets.

In the region of barrel sections 11 to 13 there is a plastifying zone, which is composed of various double- and triple-flight kneading blocks of varying width, and of retarder elements.

In the region of barrel section 13 there is a mixing zone, which is composed of various mixing and conveying elements.

In barrel section 16 there is the pressure rising zone and, following that, a die plate with 4 holes.

FIG. 1 shows a cross section through the extruder used. The extruder barrel is indicated by 1. In the interior of the barrel there are two corotating, intermeshing screws. The right-hand screw is indicated by 2, and the left-hand screw is indicated by 3. The gap between the inner wall of the barrel and the screw is termed dl. The gap between the two screws is d2. A torque was set at 85% (323 Nm) in all of the experiments.

Polycarbonate powder, carbon black and all of the other additives were premixed in a mixer from Mixaco.

The pelletization process used was strand pelletization after water-bath cooling.

The melt temperature was measured by means of a Gneuss TF-CX (FeCuNi) temperature sensor.

The specific energy input was determined according to equation 1.

The compound material produced in experiments 1-15 and in experiments 17-24 was then processed by way of an injection-moulding process to give sheets with glossy surface.

The mouldings were produced by an injection-moulding process in an FM160 injection-moulding machine from Klöckner. The cylinder diameter of said injection-moulding machine is 45 mm. For this, the polymer mixtures were predried at 110° C. for 4 hours. The injection-moulding process took place under the conditions typical for polycarbonates. For production of sheets measuring 150 mm×105 mm×3.2 mm, the melt temperatures were 260° C., the mould temperature was 80° C., the cycle time was 43 sec, the injection rate was 40 mm/sec and the backpressure was 150 bar. An injection mould with gloss polish (ISO N1) was used to produce the sheets.

Defects occurring on the surfaces of injection mouldings thus produced were identified and quantified via optical analysis methods. A suitable test method for quantitative recording of surface defects is observation of the surfaces of the mouldings under a reflected-light microscope—e.g. motorized Zeiss Axioplan 2—through an objective providing magnification of 2.5 in bright-field mode, with illumination by a halogen-100 light source. A region measuring 4 cm×4 cm of the surface was examined here by using an undulating scan pattern and photographs of said surface were taken by a CCD camera—e.g. Axiocam HRC. The photographs were used to determine the number and size of the surface defects by using image-evaluation software—e.g. Zeiss KS 300. The determination method for the number of surface defects included all surface defects of size at least 10 μm.

The surface defects detected by this optical method on mouldings made of polymer mixtures using the abovementioned compositions are generated in particular by agglomerates and aggregates made of carbon black particles, where these are insufficiently comminuted during mixing of the components in the melt within the twin-screw extruder. Surface defects can also be caused by elastomers or by a combination of elastomers and pigment particles. These surface defects are rendered clearly visible by reflected-light microscopy on suitable sections of specimens of the material. The average diameter of these surface defects is usually from about 10 µm to about 300 µm (see FIG. 7). Raman spectroscopy can be used to demonstrate that the particles are carbon (see FIG. 8).

Izod notched impact resistance was tested by the notched impact test according to ISO 180/1A. In each case, 10 test specimens were tested and these results were used to determine the arithmetic average value.

The composition introduced into the extruder is composed of a mixture made of:

pellet mixture comprising 65.64 parts by weight of a linear polycarbonate based on bisphenol A with a relative viscosity $\eta_{rel}=1.257$ (measured in $CH_2Cl_2$ as solvent at 25° C. at a concentration of 0.5 g/100 ml), 6.82 parts by weight of Metablen SRK200 as rubber, 17.54 parts by weight of a styrene-acrylonitrile copolymer made of 77% by weight of styrene and 23% by weight of acrylonitrile with weight-average molar mass $M_w$ of 130 000 g/mol (determined via GPC in tetrahydrofuran using polystyrene standard), produced by the bulk process.

Powder mixture comprising 7.42 parts by weight of a linear polycarbonate based on bisphenol A with a relative viscosity $\eta_{rel}=1.313$ (measured in $CH_2Cl_2$ as solvent at 25° C. at a concentration of 0.5 g/100 ml), 0.97 part by weight of carbon black and 1.61 parts by weight of additives, where all of the parts by weight in the composition give a total of 100.

Comparative Examples 13, 14 and 15

Comparative examples 13, 14 and 15 differ in the rotation rate of the extruder, where the rotation rate set was highest for comparative example 13 and lowest for comparative example 15 (see Table 1). The ratio of external screw diameter to internal barrel diameter measured for experiments 13, 14 and 15 was greater than or equal to 98.4% over the entire length of the processing section. The sum of external screw diameter and screw root diameter divided by twice the axial separation was greater than or equal to 99.1%.

The longitudinal proportion for which the ratio between external screw diameter and associated internal barrel diameter was smaller than 98.4% and the sum of external screw diameter and screw root diameter divided by twice the axial separation was smaller than 99.1% was 0% of the claimed region starting from the plastifying zone as far as the die plate. The proportion of the length of the processing section that complied with the conditions defined according to the invention was therefore 0%. The examples are therefore outside the range claimed according to the invention.

Comparative Examples: 7, 8 and 9

Comparative examples 7, 8 and 9 differ in the rotation rate of the extruder, where the rotation rate set was highest for comparative example 7 and lowest for comparative example 9 (see Table 1). In experiments 7, 8 and 9, elements defined according to the invention were used in the region of the discharge zone. The elements used according to the invention are composed only of conveying elements. However, the remaining regions of the processing section used elements where the ratio of external screw diameter to internal barrel diameter was greater than or equal to 98.4% and moreover the sum of external screw diameter and screw root diameter divided by twice the axial separation was greater than or equal to 99.1%. In particular, none of the kneading blocks complied with the conditions according to the invention.

The longitudinal proportion for which the ratio between external screw diameter and associated internal barrel diameter was smaller than 98.4% and the sum of external screw diameter and screw root diameter divided by twice the axial separation was smaller than 99.1% was 30% of the claimed region starting from the plastifying zone as far as the die plate. The proportion of the length of the processing section that complied with the conditions defined according to the invention was therefore 30%. The examples are therefore outside the range claimed according to the invention.

Comparative examples 7 to 9 show that reduction of the ratio between external screw diameter and internal barrel diameter, and also of the sum of external screw diameter and screw root diameter divided by twice the axial separation merely in the discharge zone, does not in itself have the desired effect on surface properties.

Comparative Examples 10 and 11

Comparative examples 10 and 11 differ in the rotation rate of the extruder, where the rotation rate set was highest for comparative example 10 and lowest for comparative example 11 (see Table 1). Experiments 10 and 11 used elements defined according to the invention in the region of the plastifying zone. Not only kneading blocks but also conveying elements and mixing elements complied with the conditions according to the invention. However, the remaining regions of the processing section used elements where the ratio of external screw diameter to internal barrel diameter was greater than or equal to 98.4% and moreover the sum of external screw diameter and screw root diameter divided by twice the axial separation was greater than or equal to 99.1%.

The longitudinal proportion for which the ratio between external screw diameter and associated internal barrel diameter was smaller than 98.4% and the sum of external screw diameter and screw root diameter divided by twice the axial separation was smaller than 99.1% was 41% of the claimed region starting from the plastifying zone as far as the die plate. The proportion of the length of the processing section that complied with the conditions defined according to the invention was therefore 41%. The examples are therefore outside the range claimed according to the invention.

Comparative examples 10 and 11 did not achieve any improvement in surface quality when comparison is made with comparative examples 13-15.

Examples 1, 2 and 3

According to the Invention

Inventive examples 1, 2 and 3 differ in the rotation rate of the extruder, where the rotation rate set was highest for inventive example 1 and lowest for inventive example 3 (see Table 1). Experiments 1, 2 and 3 used elements defined according to the invention in the region starting from the plastifying zone as far as the die plate. Not only kneading blocks but also conveying elements and mixing elements complied with the conditions according to the invention. However, the solids-conveying zone used elements where the ratio of external screw diameter to internal barrel diameter was greater than or equal to 98.4% and moreover the sum of external screw diameter and screw root diameter divided by twice the axial separation was greater than or equal to 99.1%.

The longitudinal proportion for which the ratio between external screw diameter and associated internal barrel diameter was smaller than 98.4% and the sum of external screw diameter and screw root diameter divided by twice the axial separation was smaller than 99.1% was 77% of the claimed region starting from the plastifying zone as far as the die plate. The proportion of the length of the processing section that complied with the conditions defined according to the invention was therefore 77%. The examples are therefore within the range claimed according to the invention.

Comparison of examples 1 to 3 according to the invention with comparative examples 7 to 9 and 13 to 15 not according to the invention shows the marked reduction in the extent of surface defects and a marked increase in impact resistance in the examples according to the invention.

Examples 4, 5 and 6

According to the Invention

Inventive examples 4, 5 and 6 differ in the rotation rate of the extruder, where the rotation rate set was highest for inventive example 4 and lowest for inventive example 6 (see Table 1). Throughout the processing region, experiments 4, 5 and 6 used elements defined according to the invention, where the ratio of external screw diameter to internal barrel diameter was smaller than 98.4% and moreover the sum of external screw diameter and screw root diameter divided by twice the axial separation was smaller than 99.1%. Not only kneading blocks but also conveying elements and mixing elements complied with the conditions according to the invention.

The longitudinal proportion for which the ratio between external screw diameter and associated internal barrel diameter was smaller than 98.4% and the sum of external screw diameter and screw root diameter divided by twice the axial separation was smaller than 99.1% was 77% of the claimed region starting from the plastifying zone as far as the die plate. The proportion of the length of the processing section that complied with the conditions defined according to the invention was therefore 77%. The examples are therefore within the range claimed according to the invention.

Comparison of examples 4 to 6 according to the invention with comparative examples 7 to 9 and 13 to 15 not according to the invention shows the marked reduction in the extent of surface defects and a marked increase in impact resistance in the examples according to the invention, when identical process parameters are used.

If the process parameters were instead selected in such a way that identical surface qualities were achieved, the melt temperatures could be reduced in comparison with comparative examples 13 to 15, as shown in FIG. 11, in examples 4 to 6 according to the invention, by using elements with a ratio according to the invention between the external screw diameter and the internal barrel diameter and between external screw diameter and screw root diameter, within the range described according to the invention. The melt temperatures could be reduced by 22° C. in the example by using the process according to the invention, for identical surface quality.

Example 16

CFD simulation calculations show that the process according to the invention reduces the extent of local temperature peaks in the gaps. FIG. 12 shows the local temperature peaks within the gap.

When comparison is made with the narrow gaps known in the prior art, a reduction in the extent of local temperature peaks is apparent with the gaps according to the invention. The reduction in the extent of the local temperature peaks becomes greater as the gap widths increase. All of the process parameters except for the screw gap were held constant for the simulation calculation. The process parameters used for the simulation calculation corresponded to an extruder rotation rate of 500 rpm and a throughput of 100 kg/h. The absolute temperature values vary with the process parameters.

Examples 17 to 24

Comparative Examples 19 and 20

Comparative Examples 19 and 20 differ in the rotation rate of the extruder, where the rotation rate set was highest for Comparative Example 20 and lowest for Comparative Example 19 (see Table 2). The ratio of external screw diameter to internal barrel diameter measured in experiments 19 and 20 was greater than or equal to 98.4% over the entire length of the processing section. The sum of external screw diameter and screw root diameter divided by twice the axial separation was greater than or equal to 99.1%.

The longitudinal proportion for which the ratio between external screw diameter and associated internal barrel diameter was smaller than 98.4% and the sum of external screw diameter and screw root diameter divided by twice the axial separation was smaller than 99.1% was 0% of the claimed region starting from the plastifying zone as far as the die plate. The proportion of the length of the processing section that complied with the conditions defined according to the invention was therefore 0%. The examples are therefore outside the range claimed according to the invention.

Comparative Examples 21 and 22

Comparative Examples 21 and 22 differ in the rotation rate of the extruder, where the rotation rate set was highest for Comparative Example 22 and lowest for Comparative Example 21 (see Table 2). Experiments 21 and 22 used elements defined according to the invention in the region of the plastifying zone. The elements used according to the invention are composed only of kneading blocks. However, the remaining regions of the processing section used elements where the ratio of external screw diameter to internal barrel diameter was greater than or equal to 98.4% and moreover the sum of external screw diameter and screw root diameter divided by twice the axial separation was greater than or equal to 99.1%. In particular, no conveying element complied with the conditions according to the invention.

The longitudinal proportion for which the ratio between external screw diameter and associated internal barrel diameter was smaller than 98.4% and the sum of external screw diameter and screw root diameter divided by twice the axial separation was smaller than 99.1% was 26% of the claimed region starting from the plastifying zone as far as the die plate. The proportion of the length of the processing section that complied with the conditions defined according to the invention was therefore 26%. The examples are therefore outside the range claimed according to the invention.

Comparative Examples 21 and 22 show that reduction of the ratio between external screw diameter and internal barrel diameter, and also of the sum of external screw diameter and screw root diameter divided by twice the axial separation merely in the plastifying zone, does not in itself have the desired effect on the surface properties.

Comparative Examples 23 and 24

Comparative Examples 23 and 24 differ in the rotation rate of the extruder, where the rotation rate set was highest for Comparative Example 24 and lowest for Comparative Example 23 (see Table 2). Experiments 23 and 24 used elements defined according to the invention in the region of the discharge zone. The elements used according to the invention are composed only of conveying elements. However, the remaining regions of the processing section used elements where the ratio of external screw diameter to internal barrel diameter was greater than or equal to 98.4% and moreover the sum of external screw diameter and screw root diameter divided by twice the axial separation was greater than or equal to 99.1%. In particular, none of the kneading blocks complied with the conditions according to the invention.

The longitudinal proportion for which the ratio between external screw diameter and associated internal barrel diameter was smaller than 98.4% and the sum of external screw diameter and screw root diameter divided by twice the axial separation was smaller than 99.1% was 48% of the claimed region starting from the plastifying zone as far as the die plate. The proportion of the length of the processing section that complied with the conditions defined according to the invention was therefore 48%. The examples are therefore outside the range claimed according to the invention.

Comparative Examples 23 and 24 show that reduction of the ratio between external screw diameter and internal barrel diameter, and also of the sum of external screw diameter and screw root diameter divided by twice the axial separation merely in the discharge zone, does not in itself have the desired effect on surface properties.

Examples 17 and 18

According to the Invention

Examples 17 and 18 according to the invention differ in the rotation rate of the extruder, where the rotation rate set was highest for Example 18 and lowest for Example 17 (see Table 2). Experiments 17 and 18 used elements defined according to the invention in the region starting from the plastifying zone as far as the die plate. Not only kneading blocks but also conveying elements and mixing elements complied with the conditions according to the invention. However, the solids-conveying zone used elements where the ratio of external screw diameter to internal barrel diameter was greater than or equal to 98.4% and moreover the sum of external screw diameter and screw root diameter divided by twice the axial separation was greater than or equal to 99.1%.

The longitudinal proportion for which the ratio between external screw diameter and associated internal barrel diameter was smaller than 98.4% and the sum of external screw diameter and screw root diameter divided by twice the axial separation was smaller than 99.1% was 74% of the claimed region starting from the plastifying zone as far as the die plate. The proportion of the length of the processing section that complied with the conditions defined according to the invention was therefore 74%. The examples are therefore within the range claimed according to the invention.

Comparison of Examples 17 and 18 according to the invention with Comparative Examples 19 to 24 not according to the invention shows a marked reduction in surface defects in the examples according to the invention.

TABLE 1

| | 1 | 2 | 3 | 4 | 5 | 6 | 7 | 8 | 9 | 10 | 11 | 13 | 14 | 15 |
|---|---|---|---|---|---|---|---|---|---|---|---|---|---|---|
| | according to the invention | | | according to the invention | | | comparison | | | comparison | | | comparison | |
| | Longitudinal proportion in % of indicated range in which elements and barrel sections comply with the conditions claimed according to the invention | | | | | | | | | | | | | |
| Region starting from the plastifying zone as far as the die plate | 77 | 77 | 77 | 77 | 77 | 77 | 30 | 30 | 30 | 41 | 41 | 0 | 0 | 0 |
| Throughput [kg/h] | 150 | 105 | 55 | 160 | 115 | 55 | 150 | 108 | 54 | 145 | 101 | 150 | 110 | 54 |
| Rotation rate [min$^{-1}$] | 800 | 500 | 200 | 800 | 500 | 200 | 800 | 500 | 200 | 800 | 500 | 800 | 500 | 200 |
| Energy input [kWh/kg] | 0.15 | 0.14 | 0.10 | 0.14 | 0.12 | 0.10 | 0.15 | 0.13 | 0.11 | 0.16 | 0.14 | 0.15 | 0.13 | 0.11 |
| Melt temperature [° C.] | 315 | 296 | 271 | 309 | 290 | 271 | 316 | 298 | 274 | 309 | 301 | 313 | 296 | 273 |
| Number of surface defects per cm$^2$ | 134 | 237 | 375 | 102 | 232 | 574 | 320 | 433 | 570 | 482 | 1002 | 324 | 553 | 757 |
| Notched impact resistance in kJ/m$^2$ (23° C.) | 78 | 71 | 72 | | | | | | | | | | 42 | 40 |
| Notched impact resistance in kJ/m$^2$ (−30° C.) | 15.2 | 14.6 | 13.4 | | | | | | | | | | 11.2 | 11.1 |

TABLE 2

| | Example | | | | | | | |
|---|---|---|---|---|---|---|---|---|
| | 17 | 18 | 19 | 20 | 21 | 22 | 23 | 24 |
| | according to the invention | | comparison | | comparison | | comparison | |
| | Longitudinal proportion in % of indicated range in which elements and barrel sections comply conditions claimed according to the invention | | | | | | | |
| Region staring from the plastifying zone as far as the die palate | 74 | 74 | 0 | 0 | 26 | 26 | 48 | 48 |
| Throughout [kg/h] | 70 | 145 | 75 | 145 | 75 | 145 | 70 | 145 |
| Rotation rate [min −1] | 200 | 500 | 200 | 500 | 200 | 500 | 200 | 500 |
| Energy input [kWh/kg] | 0.11 | 0.13 | 0.09 | 0.12 | 0.10 | 0.13 | 0.11 | 0.13 |
| Melt temperature [° C.] | 283 | 299 | 275 | 291 | 285 | 302 | 284 | 302 |
| Number of surface defects per cm$^2$ | 798 | 773 | 1509 | 1461 | 822 | 1425 | 1043 | 1102 |

The invention claimed is:

1. An apparatus for extruding a polymer mixture, comprising an extruder having a plasticizing zone,
a barrel,
a screw, and
a die plate having a polymer melt discharge,
wherein, at least starting from the plasticizing zone of said extruder and zones subsequent thereto in a direction of conveying, to a polymer-melt discharge at the die plate, a ratio between an external screw diameter and an internal barrel diameter over a longitudinal proportion of at least 50% of the screw in a region starting from the plasticizing zone of the extruder and the zones subsequent thereto in the direction of conveying, to the polymer-melt discharge at the die plate, is smaller than 98.4%, and the sum of the external screw diameter and a screw root diameter divided by twice an axial separation between two screws is smaller than 99.1%,
wherein the polymer mixture comprises at least one pigment, and wherein the extruder is a corotating twin- or multiscrew extruder.

2. The apparatus according to claim 1, wherein the plasticizing zone of an extruder and the zones subsequent thereto in the direction of conveying, as far as the polymer-melt discharge at the die plate, at least one conveying element is present, where, for at least one conveying element, the ratio between external screw diameter and internal barrel diameter is smaller than 98.4% and the sum of external screw diameter and screw root diameter divided by twice the axial separation between two screws is smaller than 99.1%.

3. The apparatus according to claim 1, wherein the apparatus has, at least starting from the plasticizing zone of an extruder and the zones subsequent thereto in the direction of conveying, as far as the polymer-melt discharge at the die plate, at least one kneading element, where, for at least one kneading element, the ratio between external screw diameter and internal barrel diameter is smaller than 98.4% and the sum of external screw diameter and screw root diameter divided by twice the axial separation between two screws is smaller than 99.1%.

4. The apparatus according to claim 1, wherein the ratio between external screw diameter and internal barrel diameter over a longitudinal proportion of at least 50% of the screw in the region starting from the plasticizing zone of the extruder and the zones subsequent thereto in the direction of conveying, as far as the polymer-melt discharge at the die plate is in the range from greater than or equal to 92.6% to smaller than 98.2%, and the sum of external screw diameter and screw root diameter divided by twice the axial separation between two screws is from greater than or equal to 95.6% to smaller than 99.1%.

5. The apparatus according to claim 1, wherein the ratio between external screw diameter and internal barrel diameter over a longitudinal proportion of at least 50% of the screw in the region starting from the plasticizing zone of the extruder and the zones subsequent thereto in the direction of conveying, as far as the polymer-melt discharge at the die plate is in the range from greater than or equal to 96.4% to smaller than 98.2%, and the sum of external screw diameter and screw root diameter divided by twice the axial separation between two screws is from greater than or equal to 97.9% to smaller than 99.1%.

6. The apparatus according to claim 1, wherein the ratio between the length of the extruder screw and the external screw diameter is in the range from 20 to 50.

7. The apparatus according to claim 1, wherein the diameter of the barrel bores is in the range from 18 mm to 180 mm.

8. A process for producing a polymer mixture comprising at least one polymer, at least one elastomer and at least one pigment, the process comprising providing the apparatus according to claim 1, and processing components of the polymer mixture in the apparatus according to claim 1.

9. The process according to claim 8, wherein the polymer mixture comprises the following constituents:
A) from 10 to 99.899 parts by weight aromatic polycarbonate and/or aromatic polyester carbonate and/or other thermoplastics,
B) from 0.1 to 75 parts by weight [from 0.5 to 52 parts by weight,] of elastomer,
C) from 0.001 to 10 parts by weight of one or more organic or inorganic pigments,
D) from 0 to 5 parts by weight, of one or more additives, where all of the parts by weight data have been standardized in such a way that the sum of the parts by weight of all of components A+B+C+D in the composition is 100.

10. The process according to claim 9, wherein the thermoplastics of component A is one selected from the group consisting of polycarbonate, polyamide, polyester, polylactide, polyether, thermoplastic polyurethane, polyacetal, fluoropolymer, polyether sulphones, polyolefin, polyimide, polyacrylate, polyphenylene oxide, polyphenylene sulphide, polyether ketone, polyaryl ether ketone, styrene polymers, polyvinyl chloride, and mixtures thereof.

11. The process according to claim 9, wherein component B used comprises at least one of the following monomers and graft bases: B.1 from 5 to 95% by weight, of at least one vinyl monomer and B.2 from 95 to 5% by weight, of one or more graft bases with glass transition temperatures <10° C.

12. The process according to claim 9, wherein at least one pigment of component C is selected from titanium dioxide, talc, calcium carbonate, barium sulphate, zinc sulphide, zinc oxide, iron oxide, chromium oxide, other organic and inorganic colour pigments, graphite, graphene, carbon nanotubes, phyllosilicates and carbon black.

13. The process according to claim 9, wherein said one or more additives of component D added to the polymer mixture comprise flame retardants, heat stabilizers, antioxidants, UV stabilizers and/or mould-release agents.

14. The process according to claim 9, wherein the polycarbonate was produced by interfacial process or melt-transesterification process.

15. The apparatus according to claim 1, wherein the ratio between external screw diameter and internal barrel diameter over a longitudinal proportion of at least 50% of the screw in the region starting from the plasticizing zone of the extruder and the zones subsequent thereto in the direction of conveying, as far as the polymer-melt discharge at the die plate, and over at least one conveying element and/or at least one kneading element, is in the range from greater than or equal to 92.6% to smaller than 98.2%, and the sum of external screw diameter and screw root diameter divided by twice the axial separation between two screws is from greater than or equal to 95.6% to smaller than 99.1%.

16. The apparatus according to claim 1, wherein the ratio between external screw diameter and internal barrel diameter over a longitudinal proportion of at least 50% of the screw in the region starting from the plasticizing zone of the extruder and the zones subsequent thereto in the direction of conveying, as far as the polymer-melt discharge at the die plate, and over at least one conveying element and/or at least one kneading element, is in the range from greater than or equal to 96.4% to smaller than 98.2%, and the sum of external screw diameter and screw root diameter divided by twice the axial separation between two screws is from greater than or equal to 97.9% to smaller than 99.1%.

\* \* \* \* \*

UNITED STATES PATENT AND TRADEMARK OFFICE
CERTIFICATE OF CORRECTION

PATENT NO.        : 9,561,613 B2
APPLICATION NO.   : 13/809578
DATED             : February 7, 2017
INVENTOR(S)       : Derfuss et al.

Page 1 of 1

It is certified that error appears in the above-identified patent and that said Letters Patent is hereby corrected as shown below:

On the Title Page

Item [75], insert:
--Birgit Derfuss, Muelheim an de Ruhr, GERMANY;
Reiner Ruldof, Langenfeld, GERMANY;
Michael Bierdel, Leverkusen, GERMANY;
Carsten Conzen, Leverkusen, GERMANY;--

Signed and Sealed this
First Day of August, 2017

Joseph Matal
*Performing the Functions and Duties of the*
*Under Secretary of Commerce for Intellectual Property and*
*Director of the United States Patent and Trademark Office*